United States Patent
Caudy et al.

(10) Patent No.: US 10,642,829 B2
(45) Date of Patent: *May 5, 2020

(54) DISTRIBUTED AND OPTIMIZED GARBAGE COLLECTION OF EXPORTED DATA OBJECTS

(71) Applicant: Deephaven Data Labs LLC, Plymouth, MN (US)

(72) Inventors: Ryan Caudy, New York, NY (US); David R. Kent, IV, Colorado Springs, CO (US); Charles Wright, Cortlandt Manor, NY (US); Radu Teodorescu, New York, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 505 days.

This patent is subject to a terminal disclaimer.

(21) Appl. No.: 15/478,212

(22) Filed: Apr. 3, 2017

(65) Prior Publication Data

US 2017/0206229 A1 Jul. 20, 2017

Related U.S. Application Data

(63) Continuation of application No. 15/154,983, filed on May 14, 2016, now Pat. No. 9,612,959.

(Continued)

(51) Int. Cl.
*G06F 16/2453* (2019.01)
*G06F 16/23* (2019.01)
(Continued)

(52) U.S. Cl.
CPC ........ *G06F 16/2453* (2019.01); *G06F 3/0481* (2013.01); *G06F 3/0482* (2013.01);
(Continued)

(58) Field of Classification Search
CPC .. G06F 16/2453; G06F 16/144; G06F 16/242; G06F 16/2255; G06F 16/2308; G06F 16/113; G06F 16/24575; G06F 16/2358; G06F 16/22; G06F 16/23; G06F 16/162
(Continued)

(56) References Cited

U.S. PATENT DOCUMENTS 5,335,202 A 8/1994 Manning et al.
5,452,434 A 9/1995 Macdonald
(Continued)

FOREIGN PATENT DOCUMENTS

CA 2309462 A1 12/2000
EP 1406463 A2 4/2004
(Continued)

OTHER PUBLICATIONS

Non-final Office Action dated Sep. 22, 2016, in U.S. Appl. No. 15/154,987.
(Continued)

*Primary Examiner* — Phong H Nguyen
(74) *Attorney, Agent, or Firm* — Carmichael IP, PLLC

(57) ABSTRACT

Described are methods, systems and computer readable media for distributed and optimized garbage collection of remote and exported object handle links to update propagation graph nodes.

29 Claims, 15 Drawing Sheets

Related U.S. Application Data

(60) Provisional application No. 62/161,813, filed on May 14, 2015.

(51) Int. Cl.
| | |
|---|---|
| G06F 16/22 | (2019.01) |
| G06F 16/16 | (2019.01) |
| G06F 16/242 | (2019.01) |
| G06F 16/2457 | (2019.01) |
| G06F 16/27 | (2019.01) |
| G06F 16/215 | (2019.01) |
| G06F 16/245 | (2019.01) |
| G06F 16/248 | (2019.01) |
| G06F 16/25 | (2019.01) |
| G06F 16/28 | (2019.01) |
| G06F 16/907 | (2019.01) |
| G06F 16/951 | (2019.01) |
| G06F 16/2455 | (2019.01) |
| G06F 16/901 | (2019.01) |
| G06F 16/9535 | (2019.01) |
| G06F 16/955 | (2019.01) |
| G06F 16/957 | (2019.01) |
| G06F 21/00 | (2013.01) |
| G06F 21/62 | (2013.01) |
| G06F 3/0482 | (2013.01) |
| G06F 3/0489 | (2013.01) |
| G06F 17/22 | (2006.01) |
| G06F 17/24 | (2006.01) |
| G06F 17/27 | (2006.01) |
| G06F 12/084 | (2016.01) |
| H04L 12/58 | (2006.01) |
| G06F 15/173 | (2006.01) |
| G06F 3/0481 | (2013.01) |
| G06F 3/0484 | (2013.01) |
| G06F 3/0485 | (2013.01) |
| G06F 12/02 | (2006.01) |
| G06F 8/30 | (2018.01) |
| G06F 8/41 | (2018.01) |
| H04L 29/08 | (2006.01) |
| G06F 3/06 | (2006.01) |
| G06F 11/14 | (2006.01) |
| H04L 29/06 | (2006.01) |
| G06F 8/60 | (2018.01) |
| H04L 12/18 | (2006.01) |
| H04L 29/12 | (2006.01) |
| G06F 12/14 | (2006.01) |
| G06F 3/0483 | (2013.01) |
| G06F 16/14 | (2019.01) |
| G06F 16/11 | (2019.01) |
| G06F 17/40 | (2006.01) |

(52) U.S. Cl.
CPC .......... *G06F 3/0483* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 12/1483* (2013.01); *G06F 15/17331* (2013.01); *G06F 16/113* (2019.01); *G06F 16/144* (2019.01); *G06F 16/162* (2019.01); *G06F 16/215* (2019.01); *G06F 16/22* (2019.01); *G06F 16/221* (2019.01); *G06F 16/2228* (2019.01); *G06F 16/2237* (2019.01); *G06F 16/2255* (2019.01); *G06F 16/2264* (2019.01); *G06F 16/2272* (2019.01); *G06F 16/2282* (2019.01); *G06F 16/23* (2019.01); *G06F 16/2308* (2019.01); *G06F 16/2358* (2019.01); *G06F 16/2365* (2019.01); *G06F 16/2372* (2019.01); *G06F 16/2379* (2019.01); *G06F 16/242* (2019.01); *G06F 16/245* (2019.01); *G06F 16/248* (2019.01); *G06F 16/2428* (2019.01); *G06F 16/2455* (2019.01); *G06F 16/2456* (2019.01); *G06F 16/2457* (2019.01); *G06F 16/24534* (2019.01); *G06F 16/24535* (2019.01); *G06F 16/24537* (2019.01); *G06F 16/24539* (2019.01); *G06F 16/24553* (2019.01); *G06F 16/24575* (2019.01); *G06F 16/254* (2019.01); *G06F 16/27* (2019.01); *G06F 16/278* (2019.01); *G06F 16/285* (2019.01); *G06F 16/907* (2019.01); *G06F 16/9024* (2019.01); *G06F 16/951* (2019.01); *G06F 16/9535* (2019.01); *G06F 16/9566* (2019.01); *G06F 16/9574* (2019.01); *G06F 17/2235* (2013.01); *G06F 17/24* (2013.01); *G06F 17/245* (2013.01); *G06F 17/246* (2013.01); *G06F 17/276* (2013.01); *G06F 17/2715* (2013.01); *G06F 21/00* (2013.01); *G06F 21/6209* (2013.01); *H04L 12/18* (2013.01); *H04L 51/046* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/141* (2013.01); *H04L 67/28* (2013.01); *H04L 67/2833* (2013.01); *H04L 67/2842* (2013.01); *H04L 67/34* (2013.01); *H04L 67/42* (2013.01); *H04L 69/16* (2013.01); *G06F 16/2291* (2019.01); *G06F 17/40* (2013.01); *G06F 2201/805* (2013.01); *G06F 2201/84* (2013.01); *G06F 2212/1052* (2013.01); *G06F 2212/154* (2013.01); *G06F 2212/163* (2013.01); *G06F 2212/60* (2013.01); *H04L 67/2847* (2013.01)

(58) Field of Classification Search
USPC ........................................................ 707/814
See application file for complete search history.

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,411 A | 7/1998 | Groff et al. |
| 5,787,428 A | 7/1998 | Hart |
| 5,806,059 A | 9/1998 | Tsuchida et al. |
| 5,808,911 A * | 9/1998 | Tucker ................ G06F 12/0261 711/E12.01 |
| 5,859,972 A | 1/1999 | Subramaniam et al. |
| 5,873,075 A | 2/1999 | Cochrane et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |

(56) References Cited

U.S. PATENT DOCUMENTS

| | | | |
|---|---|---|---|
| 5,960,087 | A | 9/1999 | Tribble et al. |
| 5,991,810 | A | 11/1999 | Shapiro et al. |
| 5,999,918 | A | 12/1999 | Williams et al. |
| 6,006,220 | A | 12/1999 | Haderle et al. |
| 6,032,144 | A | 2/2000 | Srivastava et al. |
| 6,032,148 | A | 2/2000 | Wilkes |
| 6,038,563 | A | 3/2000 | Bapat et al. |
| 6,058,394 | A | 5/2000 | Bakow et al. |
| 6,061,684 | A | 5/2000 | Glasser et al. |
| 6,138,112 | A | 10/2000 | Slutz |
| 6,160,548 | A | 12/2000 | Lea et al. |
| 6,253,195 | B1 | 6/2001 | Hudis et al. |
| 6,266,669 | B1 | 7/2001 | Brodersen et al. |
| 6,289,357 | B1 | 9/2001 | Parker |
| 6,292,803 | B1 | 9/2001 | Richardson et al. |
| 6,304,876 | B1 | 10/2001 | Isip |
| 6,317,728 | B1 | 11/2001 | Kane |
| 6,327,702 | B1 | 12/2001 | Sauntry et al. |
| 6,336,114 | B1 | 1/2002 | Garrison |
| 6,353,819 | B1 | 3/2002 | Edwards et al. |
| 6,367,068 | B1 | 4/2002 | Vaidyanathan et al. |
| 6,389,414 | B1 | 5/2002 | Delo et al. |
| 6,389,462 | B1 | 5/2002 | Cohen et al. |
| 6,397,206 | B1 | 5/2002 | Hill et al. |
| 6,438,537 | B1 | 8/2002 | Netz et al. |
| 6,446,069 | B1 | 9/2002 | Yaung et al. |
| 6,460,037 | B1 | 10/2002 | Weiss et al. |
| 6,473,750 | B1 | 10/2002 | Petculescu et al. |
| 6,487,552 | B1 | 11/2002 | Lei et al. |
| 6,496,833 | B1 | 12/2002 | Goldberg et al. |
| 6,505,189 | B1 | 1/2003 | Au et al. |
| 6,505,241 | B2 | 1/2003 | Pitts |
| 6,510,551 | B1 | 1/2003 | Miller |
| 6,519,604 | B1 | 2/2003 | Acharya et al. |
| 6,530,075 | B1 | 3/2003 | Beadle et al. |
| 6,538,651 | B1 | 3/2003 | Hayman et al. |
| 6,546,402 | B1 | 4/2003 | Beyer et al. |
| 6,553,375 | B1 | 4/2003 | Huang et al. |
| 6,584,474 | B1 | 6/2003 | Pereira |
| 6,604,104 | B1 | 8/2003 | Smith |
| 6,618,720 | B1 | 9/2003 | Au et al. |
| 6,631,374 | B1 | 10/2003 | Klein et al. |
| 6,640,234 | B1 | 10/2003 | Coffen et al. |
| 6,697,880 | B1 | 2/2004 | Dougherty |
| 6,701,415 | B1 | 3/2004 | Hendren |
| 6,714,962 | B1 | 3/2004 | Helland et al. |
| 6,725,243 | B2 | 4/2004 | Snapp |
| 6,732,100 | B1 | 5/2004 | Brodersen et al. |
| 6,745,332 | B1 | 6/2004 | Wong et al. |
| 6,748,374 | B1 | 6/2004 | Madan et al. |
| 6,748,455 | B1 | 6/2004 | Hinson et al. |
| 6,760,719 | B1 | 7/2004 | Hanson et al. |
| 6,775,660 | B2 | 8/2004 | Lin et al. |
| 6,785,668 | B1 | 8/2004 | Polo et al. |
| 6,795,851 | B1 | 9/2004 | Noy |
| 6,801,908 | B1 | 10/2004 | Fuloria et al. |
| 6,816,855 | B2 | 11/2004 | Hartel et al. |
| 6,820,082 | B1 | 11/2004 | Cook et al. |
| 6,829,620 | B2 | 12/2004 | Michael et al. |
| 6,832,229 | B2 | 12/2004 | Reed |
| 6,851,088 | B1 | 2/2005 | Conner et al. |
| 6,882,994 | B2 | 4/2005 | Yoshimura et al. |
| 6,925,472 | B2 | 8/2005 | Kong |
| 6,934,717 | B1 | 8/2005 | James |
| 6,947,928 | B2 | 9/2005 | Dettinger et al. |
| 6,983,291 | B1 | 1/2006 | Cochrane et al. |
| 6,985,895 | B2 | 1/2006 | Witkowski et al. |
| 6,985,899 | B2 | 1/2006 | Chan et al. |
| 6,985,904 | B1 | 1/2006 | Kaluskar et al. |
| 7,020,649 | B2 | 3/2006 | Cochrane et al. |
| 7,024,414 | B2 | 4/2006 | Sah et al. |
| 7,031,962 | B2 | 4/2006 | Moses |
| 7,047,484 | B1 | 5/2006 | Becker et al. |
| 7,058,657 | B1 | 6/2006 | Berno |
| 7,089,228 | B2 | 8/2006 | Arnold et al. |
| 7,089,245 | B1 | 8/2006 | George et al. |
| 7,096,216 | B2 | 8/2006 | Anonsen |
| 7,099,927 | B2 | 8/2006 | Cudd et al. |
| 7,103,608 | B1 | 9/2006 | Ozbutun et al. |
| 7,110,997 | B1 | 9/2006 | Turkel et al. |
| 7,127,462 | B2 | 10/2006 | Hiraga et al. |
| 7,146,357 | B2 | 12/2006 | Suzuki et al. |
| 7,149,742 | B1 | 12/2006 | Eastham et al. |
| 7,167,870 | B2 | 1/2007 | Avvari et al. |
| 7,171,469 | B2 | 1/2007 | Ackaouy et al. |
| 7,174,341 | B2 | 2/2007 | Ghukasyan et al. |
| 7,181,686 | B1 | 2/2007 | Bahrs |
| 7,188,105 | B2 | 3/2007 | Dettinger et al. |
| 7,200,620 | B2 | 4/2007 | Gupta |
| 7,216,115 | B1 | 5/2007 | Walters et al. |
| 7,216,116 | B1 | 5/2007 | Nilsson et al. |
| 7,219,302 | B1 | 5/2007 | O'Shaughnessy et al. |
| 7,225,189 | B1 | 5/2007 | McCormack et al. |
| 7,254,808 | B2 | 8/2007 | Trappen et al. |
| 7,257,689 | B1 | 8/2007 | Baird |
| 7,272,605 | B1 | 9/2007 | Hinshaw et al. |
| 7,308,580 | B2 | 12/2007 | Nelson et al. |
| 7,316,003 | B1 | 1/2008 | Dulepet et al. |
| 7,330,969 | B2 | 2/2008 | Harrison et al. |
| 7,333,941 | B1 | 2/2008 | Choi |
| 7,343,585 | B1 | 3/2008 | Lau et al. |
| 7,350,237 | B2 | 3/2008 | Vogel et al. |
| 7,380,242 | B2 | 5/2008 | Alaluf |
| 7,401,088 | B2 | 7/2008 | Chintakayala et al. |
| 7,426,521 | B2 | 9/2008 | Harter |
| 7,430,549 | B2 | 9/2008 | Zane et al. |
| 7,433,863 | B2 | 10/2008 | Zane et al. |
| 7,447,865 | B2 | 11/2008 | Uppala et al. |
| 7,478,094 | B2 | 1/2009 | Ho et al. |
| 7,484,096 | B1 | 1/2009 | Garg et al. |
| 7,493,311 | B1 | 2/2009 | Cutsinger et al. |
| 7,506,055 | B2 | 3/2009 | McClain et al. |
| 7,529,734 | B2 | 5/2009 | Dirisala |
| 7,529,750 | B2 | 5/2009 | Bair |
| 7,542,958 | B1 | 6/2009 | Warren et al. |
| 7,552,223 | B1 | 6/2009 | Ackaouy et al. |
| 7,596,550 | B2 | 9/2009 | Mordvinov et al. |
| 7,610,351 | B1 | 10/2009 | Gollapudi et al. |
| 7,620,687 | B2 | 11/2009 | Chen et al. |
| 7,624,126 | B2 | 11/2009 | Pizzo et al. |
| 7,627,603 | B2 | 12/2009 | Rosenblum et al. |
| 7,661,141 | B2 | 2/2010 | Dutta et al. |
| 7,664,778 | B2 | 2/2010 | Yagoub et al. |
| 7,672,275 | B2 | 3/2010 | Yajnik et al. |
| 7,680,782 | B2 | 3/2010 | Chen et al. |
| 7,711,716 | B2 | 5/2010 | Stonecipher |
| 7,711,740 | B2 | 5/2010 | Minore et al. |
| 7,711,788 | B2 | 5/2010 | Ran et al. |
| 7,747,640 | B2 | 6/2010 | Dettinger et al. |
| 7,761,444 | B2 | 7/2010 | Zhang et al. |
| 7,797,356 | B2 | 9/2010 | Iyer et al. |
| 7,827,204 | B2 | 11/2010 | Heinzel et al. |
| 7,827,403 | B2 | 11/2010 | Wong et al. |
| 7,827,523 | B2 | 11/2010 | Ahmed et al. |
| 7,882,121 | B2 | 2/2011 | Bruno et al. |
| 7,882,132 | B2 | 2/2011 | Ghatare |
| 7,895,191 | B2 | 2/2011 | Colossi et al. |
| 7,904,487 | B2 | 3/2011 | Ghatare |
| 7,908,259 | B2 | 3/2011 | Branscome et al. |
| 7,908,266 | B2 | 3/2011 | Zeringue et al. |
| 7,930,412 | B2 | 4/2011 | Yeap et al. |
| 7,966,311 | B2 | 6/2011 | Haase |
| 7,966,312 | B2 | 6/2011 | Nolan et al. |
| 7,966,343 | B2 | 6/2011 | Yang et al. |
| 7,970,777 | B2 | 6/2011 | Saxena et al. |
| 7,979,431 | B2 | 7/2011 | Qazi et al. |
| 7,984,043 | B1 | 7/2011 | Waas |
| 8,019,795 | B2 | 9/2011 | Anderson et al. |
| 8,027,293 | B2 | 9/2011 | Spaur et al. |
| 8,032,525 | B2 | 10/2011 | Bowers et al. |
| 8,037,542 | B2 | 10/2011 | Taylor et al. |
| 8,046,394 | B1 | 10/2011 | Shatdal |
| 8,046,749 | B1 | 10/2011 | Owen et al. |
| 8,055,672 | B2 | 11/2011 | Djugash et al. |

(56) References Cited

U.S. PATENT DOCUMENTS

| | | |
|---|---|---|
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,621,424 B2 | 12/2013 | Kejariwal et al. |
| 8,631,034 B1 | 1/2014 | Peloski |
| 8,635,251 B1 | 1/2014 | Chan |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,875 B1 | 8/2014 | Bawcom et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,177,079 B1 | 11/2015 | Ramachandran et al. |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 9,477,702 B1 | 10/2016 | Ramachandran et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent, IV et al. |
| 9,633,060 B2 | 4/2017 | Caudy et al. |
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,847,917 B2 * | 12/2017 | Varney ................ H04L 41/0893 |
| 9,886,469 B2 | 2/2018 | Kent, IV et al. |
| 9,898,496 B2 | 2/2018 | Caudy et al. |
| 9,934,266 B2 | 4/2018 | Wright et al. |
| 10,002,153 B2 | 6/2018 | Teodorescu et al. |
| 10,002,154 B1 | 6/2018 | Kent, IV et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 * | 1/2003 | Nixon ................ G05B 19/4145 |
| | | 707/999.01 |
| 2003/0061216 A1 | 3/2003 | Moses |
| 2003/0074400 A1 | 4/2003 | Brooks et al. |
| 2003/0110416 A1 * | 6/2003 | Morrison ................ G06F 9/54 |
| | | 714/39 |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dellinger et al. |
| 2004/0015566 A1 * | 1/2004 | Anderson ............... G06Q 20/00 |
| | | 709/219 |
| 2004/0076155 A1 | 4/2004 | Yajnik et al. |
| 2004/0111492 A1 | 6/2004 | Nakahara et al. |
| 2004/0148630 A1 | 7/2004 | Choi |
| 2004/0186813 A1 * | 9/2004 | Tedesco ............ G06K 9/00624 |
| | | 706/14 |
| 2004/0216150 A1 | 10/2004 | Scheifler et al. |
| 2004/0220923 A1 | 11/2004 | Nica |
| 2004/0254876 A1 | 12/2004 | Coval et al. |
| 2004/0267824 A1 | 12/2004 | Pizzo et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 * | 6/2005 | Morrison ................ G06F 9/54 |
| | | 719/312 |
| 2005/0138624 A1 * | 6/2005 | Morrison ................ G06F 9/54 |
| | | 718/102 |
| 2005/0144189 A1 * | 6/2005 | Edwards ............... G06F 16/185 |
| | | 707/E17.01 |
| 2005/0149944 A1 * | 7/2005 | Morrison ................ G06F 9/54 |
| | | 719/310 |
| 2005/0165866 A1 | 7/2005 | Bohannon et al. |
| 2005/0198001 A1 | 9/2005 | Cunningham et al. |
| 2005/0228828 A1 | 10/2005 | Chandrasekar et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0131383 A1 | 6/2006 | Battagin et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |

(56) References Cited

U.S. PATENT DOCUMENTS

| | | |
|---|---|---|
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0113014 A1 | 5/2007 | Manolov et al. |
| 2007/0116287 A1 | 5/2007 | Rasizade et al. |
| 2007/0169003 A1 | 7/2007 | Branda et al. |
| 2007/0198479 A1 | 8/2007 | Cai et al. |
| 2007/0256060 A1 | 11/2007 | Ryu et al. |
| 2007/0258508 A1* | 11/2007 | Werb ............... H04W 84/18 375/140 |
| 2007/0271280 A1 | 11/2007 | Chandasekaran |
| 2007/0294217 A1 | 12/2007 | Chen et al. |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0097748 A1 | 4/2008 | Haley et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0172639 A1 | 7/2008 | Keysar et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0037500 A1 | 2/2009 | Kirshenbaum |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0023952 A1 | 1/2010 | Sandoval et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0070721 A1 | 3/2010 | Pugh et al. |
| 2010/0114890 A1 | 5/2010 | Hagar et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0314019 A1 | 12/2011 | Peris |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166551 A1 | 6/2013 | Wong et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0026121 A1 | 1/2014 | Jackson et al. |
| 2014/0040203 A1 | 2/2014 | Lu et al. |
| 2014/0046638 A1 | 2/2014 | Peloski |
| 2014/0059646 A1 | 2/2014 | Hannel et al. |
| 2014/0082470 A1 | 3/2014 | Trebas et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1* | 6/2014 | Varney ............... H04L 41/0893 709/217 |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0289700 A1 | 9/2014 | Srinivasaraghavan et al. |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1* | 11/2014 | Varney ............... H04L 41/50 709/213 |
| 2014/0358892 A1* | 12/2014 | Nizami ............... G06F 16/951 707/711 |
| 2014/0359574 A1 | 12/2014 | Beckwith et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0032789 A1 | 1/2015 | Nguyen et al. |
| 2015/0067640 A1 | 3/2015 | Booker et al. |
| 2015/0074066 A1 | 3/2015 | Li et al. |

(56) References Cited

U.S. PATENT DOCUMENTS

| | | |
|---|---|---|
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2015/0356157 A1 | 12/2015 | Anderson et al. |
| 2016/0026383 A1 | 1/2016 | Lee et al. |
| 2016/0026442 A1 | 1/2016 | Chhaparia |
| 2016/0065670 A1 | 3/2016 | Kimmel et al. |
| 2016/0085772 A1 | 3/2016 | Vermeulen et al. |
| 2016/0092599 A1 | 3/2016 | Barsness et al. |
| 2016/0103897 A1 | 4/2016 | Nysewander et al. |
| 2016/0125018 A1 | 5/2016 | Tomoda et al. |
| 2016/0147748 A1 | 5/2016 | Florendo et al. |
| 2016/0171070 A1 | 6/2016 | Hrle et al. |
| 2016/0179754 A1 | 6/2016 | Borza et al. |
| 2016/0253294 A1 | 9/2016 | Allen et al. |
| 2016/0316038 A1 | 10/2016 | Jolfaei |
| 2016/0335281 A1 | 11/2016 | Teodoresou et al. |
| 2016/0335304 A1 | 11/2016 | Teodoresou et al. |
| 2016/0335317 A1 | 11/2016 | Teodoresou et al. |
| 2016/0335323 A1 | 11/2016 | Teodoresou et al. |
| 2016/0335330 A1 | 11/2016 | Teodoresou et al. |
| 2016/0335361 A1 | 11/2016 | Teodoresou et al. |
| 2017/0032016 A1 | 2/2017 | Zinner et al. |
| 2017/0161514 A1 | 6/2017 | Dettinger et al. |
| 2017/0177677 A1 | 6/2017 | Wright et al. |
| 2017/0185385 A1 | 6/2017 | Kent et al. |
| 2017/0192910 A1 | 7/2017 | Wright et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0329740 A1 | 11/2017 | Crawford et al. |
| 2017/0357708 A1 | 12/2017 | Ramachandran et al. |
| 2017/0359415 A1 | 12/2017 | Venkatraman et al. |
| 2018/0004796 A1 | 1/2018 | Kent et al. |
| 2018/0011891 A1 | 1/2018 | Wright et al. |
| 2018/0052879 A1 | 2/2018 | Wright |
| 2018/0137175 A1 | 5/2018 | Teodorescu et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| GB | 2397906 A | 8/2004 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |
| WO | 2016183563 A1 | 11/2016 |

OTHER PUBLICATIONS

Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
Notice of Allowance dated Nov. 17, 2016, in U.S. Appl. No. 15/154,991.
Notice of Allowance dated Nov. 17, 2017, in U.S. Appl. No. 15/154,993.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Notice of Allowance dated Oct. 6, 2017, in U.S. Appl. No. 15/610,162.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering (ICDE 2015), Seoul, Korea, Apr. 13-17, 2015. Retrieved from http://imada.sdu.dk/~zhou/papers/icde2015.pdf.
"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).

(56) References Cited

OTHER PUBLICATIONS

"Change Data Capture", Oracle Database Online Documentation 11g Release 1 (11.1), dated Apr. 5, 2016. Retrieved from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"GNU Emacs Manual", dated Apr. 15, 2016, pp. 43-47. Retrieved from https://web.archive.org/web/20160415175915/http://www.gnu.org/software/emacs/manual/html_mono/emacs.html.
"Google Protocol RPC Library Overview", dated Apr. 27, 2016. Retrieved from https://cloud.google.com/appengine/docs/python/tools/protorpc/ (last accessed Jun. 16, 2016).
"IBM—What is HBase?", dated Sep. 6, 2015. Retrieved from https://web.archive.org/web/20150906022050/http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-ig-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Mar. 31, 2017, in U.S. Appl. No. 15/154,996.
Advisory Action dated May 3, 2017, in U.S. Appl. No. 15/154,993.
Borror, Jefferey A. "Q for Mortals 2.0", dated Nov. 1, 2011. Retreived from http://code.kx.com/wiki/JB:QforMortals2/contents.
Cheusheva, Svetlana. "How to change the row color based on a cell's value in Excel", dated Oct. 29, 2011 Retrieved from https://www.ablebits.com/office-addins-blog/2013/10/29/excel-change-row-background-color/ (last accessed Jun. 16, 2016).
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request dated Nov. 20, 2017, in U.S. Appl. No. 15/154,997.
Ex Parte Quayle Action dated Aug. 8, 2016, in U.S. Appl. No. 15/154,999.
Final Office Action dated Apr. 10, 2017, in U.S. Appl. No. 15/155,006.
Final Office Action dated Dec. 19, 2016, in U.S. Appl. No. 15/154,995.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Jul. 27, 2017, in U.S. Appl. No. 15/154,993.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Gai, Lei et al. "An Efficient Summary Graph Driven Method for RDF Query Processing", dated Oct. 27, 2015. Retreived from http://arxiv.org/pdf/1510.07749.pdf.
International Search Report and Written Opinion dated Aug. 18, 2016, in International Appl. No. PCT/US2016/032582 filed May 14, 2016.
International Search Report and Written Opinion dated Aug. 18, 2016, in International Appl. No. PCT/US2016/032584 filed May 14, 2016.
International Search Report and Written Opinion dated Aug. 18, 2016, in International Appl. No. PCT/US2016/032588 filed May 14, 2016.
International Search Report and Written Opinion dated Aug. 18, 2016, in International Appl. No. PCT/US2016/032593 filed May 14, 2016.
International Search Report and Written Opinion dated Aug. 18, 2016, in International Appl. No. PCT/US2016/032597 filed May 14, 2016.
International Search Report and Written Opinion dated Aug. 18, 2016, in International Appl. No. PCT/US2016/032599 filed May 14, 2016.
International Search Report and Written Opinion dated Aug. 18, 2016, in International Appl. No. PCT/US2016/032605 filed May 14, 2016.
International Search Report and Written Opinion dated Aug. 25, 2016, in International Appl. No. PCT/US2016/032590 filed May 14, 2016.
International Search Report and Written Opinion dated Aug. 25, 2016, in International Appl. No. PCT/US2016/032592 filed May 14, 2016.
International Search Report and Written Opinion dated Aug. 4, 2016, in International Appl. No. PCT/US2016/032581 filed May 14, 2016.
International Search Report and Written Opinion dated Jul. 28, 2016, in International Appl. No. PCT/US2016/032586 filed May 14, 2016.
International Search Report and Written Opinion dated Jul. 28, 2016, in International Appl. No. PCT/US2016/032587 filed May 14, 2016.
International Search Report and Written Opinion dated Jul. 28, 2016, in International Appl. No. PCT/US2016/032589 filed May 14, 2016.

(56) References Cited

OTHER PUBLICATIONS

International Search Report and Written Opinion dated Sep. 1, 2016, in International Appl. No. PCT/US2016/032596 filed May 14, 2016.
International Search Report and Written Opinion dated Sep. 1, 2016, in International Appl. No. PCT/US2016/032598 filed May 14, 2016.
International Search Report and Written Opinion dated Sep. 1, 2016, in International Appl. No. PCT/US2016/032601 filed May 14, 2016.
International Search Report and Written Opinion dated Sep. 1, 2016, in International Appl. No. PCT/US2016/032602 filed May 14, 2016.
International Search Report and Written Opinion dated Sep. 1, 2016, in International Appl. No. PCT/US2016/032607 filed May 14, 2016.
International Search Report and Written Opinion dated Sep. 15, 2016, in International Appl. No. PCT/US2016/032591 filed May 14, 2016.
International Search Report and Written Opinion dated Sep. 15, 2016, in International Appl. No. PCT/US2016/032594 filed May 14, 2016.
International Search Report and Written Opinion dated Sep. 15, 2016, in International Appl. No. PCT/US2016/032600 filed May 14, 2016.
International Search Report and Written Opinion dated Sep. 29, 2016, in International Appl. No. PCT/US2016/032595 filed May 14, 2016.
International Search Report and Written Opinion dated Sep. 29, 2016, in International Appl. No. PCT/US2016/032606 filed May 14, 2016.
International Search Report and Written Opinion dated Sep. 8, 2016, in International Appl. No. PCT/US2016/032603 filed May 14, 2016.
International Search Report and Written Opinion dated Sep. 8, 2016, in International Appl. No. PCT/US2016/032604 filed May 14, 2016.
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Mallet, "Relational Database Support for Spatio-Temporal Data", Technical Report TR 04-21, Sep. 2004, University of Alberta, Department of Computing Science.
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Apr. 19, 2017, in U.S. Appl. No. 15/154,974.
Non-final Office Action dated Aug. 12, 2016, in U.S. Appl. No. 15/155,001.
Non-final Office Action dated Aug. 14, 2017, in U.S. Appl. No. 15/464,314.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,983.
Non-final Office Action dated Aug. 8, 2016, in U.S. Appl. No. 15/154,985.
Non-final Office Action dated Dec. 13, 2017, in U.S. Appl. No. 15/608,963.
Non-final Office Action dated Feb. 8, 2017, in U.S. Appl. No. 15/154,997.
Non-final Office Action dated Jul. 27, 2017, in U.S. Appl. No. 15/154,995.
Non-final Office Action dated Mar. 2, 2017, in U.S. Appl. No. 15/154,984.
Non-final Office Action dated Nov. 15, 2017, in U.S. Appl. No. 15/654,461.
Non-final Office Action dated Nov. 17, 2016, in U.S. Appl. No. 15/154,999.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 5, 2017, in U.S. Appl. No. 15/428,145.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Advisory Action dated Dec. 21, 2017, in U.S. Appl. No. 15/154,984.
Breitbart, Update Propagation Protocols for Replicated Databases, SIGMOD '99 Philadelphia PA, 1999, pp. 97-108.
Final Office Action dated Aug. 10, 2018, in U.S. Appl. No. 15/796,230.
Final Office Action dated Aug. 2, 2018, in U.S. Appl. No. 15/154,996.
Final Office Action dated Aug. 28, 2018, in U.S. Appl. No. 15/813,119.
Final Office Action dated Dec. 29, 2017, in U.S. Appl. No. 15/154,974.
Final Office Action dated Jun. 18, 2018, in U.S. Appl. No. 15/155,005.
Final Office Action dated May 18, 2018, in U.S. Appl. No. 15/654,461.
Kramer, The Combining DAG: A Technique for Parallel Data Flow Analysis, IEEE Transactions on Parallel and Distributed Systems, vol. 5, No. 8, Aug. 1994, pp. 805-813.
Non-final Office Action dated Apr. 12, 2018, in U.S. Appl. No. 15/154,997.
Non-final Office Action dated Apr. 23, 2018, in U.S. Appl. No. 15/813,127.
Non-final Office Action dated Apr. 5, 2018, in U.S. Appl. No. 15/154,984.
Non-final Office Action dated Aug. 10, 2018, in U.S. Appl. No. 16/004,578.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 12, 2018, in U.S. Appl. No. 15/466,836.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Jan. 4, 2018, in U.S. Appl. No. 15/583,777.
Non-final Office Action dated Jun. 29, 2018, in U.S. Appl. No. 15/154,974.
Non-final Office Action dated Jun. 8, 2018, in U.S. Appl. No. 15/452,574.
Non-final Office Action dated Mar. 20, 2018, in U.S. Appl. No. 15/155,006.
Notice of Allowance dated Apr. 30, 2018, in U.S. Appl. No. 15/155,012.

(56) References Cited

OTHER PUBLICATIONS

Notice of Allowance dated Feb. 12, 2018, in U.S. Appl. No. 15/813,142.
Notice of Allowance dated Feb. 26, 2018, in U.S. Appl. No. 15/428,145.
Notice of Allowance dated Jul. 11, 2018, in U.S. Appl. No. 15/154,995.
Notice of Allowance dated Mar. 1, 2018, in U.S. Appl. No. 15/464,314.
Notice of Allowance dated May 4, 2018, in U.S. Appl. No. 15/897,547.
Notice of Allowance dated Sep. 11, 2018, in U.S. Appl. No. 15/608,961.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
Hartle, Thom, Conditional Formatting in Excel using CQG's RTD Bate Function (2011), http://news.cqg.com/blogs/exce/I2011/05/conditional-formatting-excel-using-cqgs-rtd-bate-function (last visited Apr. 3, 2019).
Azbel, Maria, How to hide and group columns in Excel AbleBits (2014), https://www.ablebits.com/office-addins-blog/2014/08/06/excel-hide-columns/ (last visited Jan. 18, 2019).
Dodge, Mark & Craig Stinson, Microsoft Excel 2010 inside out (2011).
Cheusheve, Svetlana, Excel formulas for conditional formatting based on another cell AbleBits (2014), https://www.ablebits.com/office-addins-blog/2014/06/10/excel-conditional-formatting-formulas/comment-page-6/(last visited Jan. 14, 2019).
Posey, Brien, "How to Combine PowerShell Cmdlets", Jun. 14, 2013 Redmond the Independent Voice of the Microsoft Community (Year: 2013), pp. 1-10.

\* cited by examiner ptionally# DISTRIBUTED AND OPTIMIZED GARBAGE COLLECTION OF EXPORTED DATA OBJECTS This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for providing optimized garbage collection of remote table handle links.

In an environment where a query server can have multiple remote clients, multiple links can be set up to tables on the query server from each remote client. There can be a system cost for maintaining all of these links, or from maintaining the data sources referenced by the links. As remote clients disconnect from from the query server or as remote clients stop using a particular table, links can still be registered for the remote clients on the query server. The number of links that need to be managed by the query server can continue to grow with new remote client connections and query operations against query server tables. If the links are not properly garbage collected after use, the amount of system resources to manage the increasing number of links and the data sources referenced by the links may also increase.

Embodiments were conceived in light of the above mentioned needs, problems and/or limitations, among other things.

Some implementations can include a system for managing distributed client-server object handles, the system comprising a remote client computer containing a first one or more hardware processors, a server computer containing a second one or more hardware processors, and the remote client computer containing a first computer readable data storage device coupled to the first one or more hardware processors, the first computer readable data storage device having stored thereon software instructions that, when executed by the first one or more hardware processors, cause the first one or more hardware processors to perform operations. The operations can include creating a remote object handle manager. The operations can also include establishing a connection with a remote query processor on the server computer. The operations can further include establishing a liveness indication system with the remote query processor. The operations can also include receiving from the remote query processor, exported object handle information for use in constructing a remote object handle, including an exported object identifier, the exported object identifier identifying an exported object. The operations can include the remote object handle manager constructing a remote object handle. The operations can also include the remote object handle manager monitoring liveness of all client objects that depend on the remote object handle, the remote object handle depending on the exported object and indirectly on the exported object's dependencies. The operations can include the remote object handle manager sending a release notification to the remote query processor including an exported object identifier, after no client objects depend on the exported object. The operations can also include the server computer containing a second computer readable data storage device coupled to the second one or more hardware processors, the second computer readable data storage device having stored thereon software instructions that, when executed by the second one or more hardware processors, cause the second one or more hardware processors to perform operations. The operations can include creating a remote query processor, the remote query processor performing operations.

The operations can include creating an exported object handle manager. The operations can also include sending the exported object handle information, including an exported object identifier from an exported object handle manager to the remote client computer. The operations can further include preserving a liveness of the exported object at least until the first of the following events: receipt of a release notification from the remote table handle manager; and the liveness indication system determines the remote client computer is not connected.

The remote query processor operations can include the remote query processor receiving a transmitted user query task from the remote client computer. The remote query processor operations can also include executing the transmitted user query task. The remote query processor operations can further include upon executing an instruction from the user query task to export an object, creating an exported object handle.

The remote query processor operations can include publishing a list of objects available for export to the remote client computer.

The operations can include wherein the remote object handle manager monitoring of client object liveness comprises maintaining a remote object handle reference count on the remote object handle. The operations can also include decrementing the remote object handle reference count after a dependent client object no longer depends on the remote object handle. The operations can further include when the remote object handle reference count after decrementing is zero, sending a digital message to the remote query processor to release an associated exported object handle.

The operations can include wherein the exported object handle maintains a strong reference to one or more components of an update propagation graph created on the server computer.

The operations can include wherein the relationship between a remote object handle and its associated exported object extends an update propagation graph across at least one of multiple remote query processors and multiple clients.

The operations can include wherein the remote object handle invokes one or more methods on an exported object and delivers return values as copied objects or remote object handles of exported objects.

The operations can include wherein the remote client computer and the server computer are different computers.

The operations can include wherein the remote object handle manager monitoring of client object liveness comprises the remote object handle manager monitoring a handle cleanup reference queue and after a handle cleanup reference appears in the handle cleanup reference queue, invoking a handle cleanup reference cleanup method. The operations can further include the handle cleanup reference cleanup method removing the handle cleanup reference from a set of handle cleanup references monitored by the remote object handle manager, thereby eliminating all strong references to the handle cleanup reference. The operations can further include the handle cleanup reference cleanup method sending a digital message to the remote query processor to release an associated exported object handle.

The operations can include wherein the remote object handle manager monitoring of client object liveness comprises the remote object handle manager monitoring a handle cleanup reference queue and after a handle cleanup reference appears in the handle cleanup reference queue, invoking a handle cleanup reference cleanup method. The operations can also include the handle cleanup reference cleanup method decrementing a remote object handle reference count on a remote object handle associated with the handle cleanup reference. The operations can further include the handle cleanup reference cleanup method removing the handle cleanup reference from a set of handle cleanup references monitored by the remote object handle manager. The operations can include when the remote object handle reference count after decrementing is zero, sending a digital message to the remote query processor to release an associated exported object handle.

The operations can include wherein the remote query processor preserving a liveness of the exported object comprises maintaining a reference count associated with the exported object. The operations can also include decrementing the reference count associated with the exported object after receipt of a release notification from the remote table handle manager. The operations can further include decrementing the reference count associated with the exported object after the liveness indication system determines the remote client computer is not connected. The operations can also include when the remote object handle reference count after decrementing is zero, removing a strong reference to the exported object from the exported object handle. The operations can include when the remote object handle reference count after decrementing is greater than zero, maintaining a strong reference to the exported object from the exported object handle.

Some implementations can include a method for managing distributed client-server object handles, the method comprising creating a remote object handle manager. The method can also include establishing a connection with a remote query processor on a server computer. The method can further include establishing a liveness indication system with the remote query processor. The method can also include receiving from the remote query processor, exported object handle information for use in constructing a remote object handle, including an exported object identifier, the exported object identifier identifying an exported object. The method can include the remote object handle manager constructing a remote object handle. The method can also include the remote object handle manager monitoring liveness of all client objects that depend on the remote object handle, the remote object handle depending on the exported object and indirectly on the exported object's dependencies. The method can include the remote object handle manager sending a release notification to the remote query processor including an exported object identifier, after no client objects depend on the exported object. The method can also include creating a remote query processor, the remote query processor performing operations.

The operations can include creating an exported object handle manager. The operations can also include sending the exported object handle information, including an exported object identifier from an exported object handle manager to a remote client computer. The operations can further include preserving a liveness of the exported object until receipt of a release notification from the remote table handle manager or until the liveness indication system determines the remote client computer is not connected.

The remote query processor operations can further include the remote query processor receiving a transmitted user query task from a remote client computer. The operations can also include executing the transmitted user query task. The operations can further include upon executing an instruction from the user query task to export an object, creating an exported object handle.

The remote query processor operations can include publishing a list of objects available for export to the remote client computer.

The method can include the operations of the first one or more hardware processors further comprising the remote object handle manager monitoring a handle cleanup reference queue. The operations can also include after a handle cleanup reference appears in the handle cleanup reference queue, invoking a handle cleanup reference cleanup method. The operations can further include the handle cleanup reference cleanup method decrementing a remote object handle reference count on a remote object handle associated with the handle cleanup reference. The operations can also include the handle cleanup reference cleanup method removing the handle cleanup reference from a set of handle cleanup references monitored by the remote object handle manager. The operations can include when the remote object handle reference count after decrementing is zero, sending a digital message to the remote query processor to release an associated exported object handle. The operations can also include when the remote object handle reference count after decrementing is greater than zero, maintaining a strong reference to the remote object handle in order to ensure liveness for dependent client objects.

The method can include wherein the exported object handle maintains a strong reference to an update propagation graph created on the server computer.

The method can include wherein the relationship between a remote object handle and its associated exported object extends an update propagation graph across at least one of multiple remote query processors and multiple clients.

The method can include wherein the remote object handle invokes one or more methods on an exported object and delivers return values as copied objects or remote object handles of exported objects.

The method can include wherein the remote client computer and the server computer are different computers.

The method can also include wherein the preserving a liveness of the exported object comprises maintaining a reference count associated with the exported object. The method also includes decrementing the reference count associated with the exported object after receipt of a release notification from the remote table handle manager. The method further includes decrementing the reference count associated with the exported object after the liveness indication system determines the remote client computer is not connected. The method also includes when the remote object handle reference count after decrementing is zero, removing a strong reference to the exported object from the exported object handle. The method further includes when the remote object handle reference count after decrementing is greater than zero, maintaining a strong reference to the exported object from the exported object handle.

Some implementations can include a nontransitory computer readable medium having stored thereon software instructions that, when executed by one or more processors, cause the one or more processors to perform operations. The operations can include creating a remote object handle manager. The operations can also include establishing a connection with a remote query processor on a server computer. The operations can further include establishing a liveness indication system with the remote query processor. The operations can also include receiving from the remote query processor, exported object handle information for use in constructing a remote object handle, including an exported object identifier, the exported object identifier identifying an exported object. The operations can include the remote object handle manager constructing a remote object handle. The operations can also include the remote object handle manager monitoring liveness of all client objects that depend on the remote object handle, the remote object handle depending on the exported object and indirectly on the exported object's dependencies. The operations can include the remote object handle manager sending a release notification to the remote query processor including an exported object identifier, after no client objects depend on the exported object. The operations can also include the server computer containing a second computer readable data storage device coupled to the second one or more hardware processors, the second computer readable data storage device having stored thereon software instructions that, when executed by the second one or more hardware processors, cause the second one or more hardware processors to perform operations.

The operations can include creating a remote query processor, the remote query processor performing operations including creating an exported object handle manager. The remote query processor operations can also include sending the exported object handle information, including an exported object identifier from an exported object handle manager to the remote client. The remote query operations can further include preserving a liveness of the exported object until receipt of a release notification from the remote table handle manager or until the liveness indication system determines the remote client is not connected.

The operations can include the remote query processor receiving a transmitted user query task from the remote client computer. The operations can also include executing the transmitted user query task. The operations can further include upon executing an instruction from the user query task to export an object, creating an exported object handle.

The operations can include publishing a list of objects available for export to the remote client.

The operations can include the remote object handle manager monitoring a handle cleanup reference queue. The operations can also include after a handle cleanup reference appears in the handle cleanup reference queue, invoking a handle cleanup reference cleanup method. The operations can further include the handle cleanup reference cleanup method decrementing a remote object handle reference count on a remote object handle associated with the handle cleanup reference. The operations can also include the handle cleanup reference cleanup method removing the handle cleanup reference from a set of handle cleanup references monitored by the remote object handle manager. The operations can include when the remote object handle reference count after decrementing is zero, sending a digital message to the remote query processor to release an associated exported object handle. The operations can also include when the remote object handle reference count after decrementing is greater than zero, maintaining a strong reference to the remote object handle in order to ensure liveness for dependent client objects.

The operations can include wherein the exported object handle maintains a strong reference to an update propagation graph created on the server computer.

The operations can include wherein the relationship between a remote object handle and its associated exported object extends an update propagation graph across at least one of multiple remote query processors and multiple clients.

The operations can include wherein the remote object handle invokes one or more methods on an exported object and delivers return values as copied objects or remote object handles of exported objects.

The operations can include wherein the remote client computer and the server computer are different computers.

Some implementations can include a method for monitoring liveness of parent objects and child objects participating in an update propagation graph on a query processing computer having parent listener objects and child listener objects, the method comprising maintaining continued liveness of said parent objects so long as their child objects have continued liveness. The method can also include permitting termination of liveness of dependent child objects when their parent objects have continued liveness. The method can further include maintaining continued liveness of said parent listener objects so long as their child objects have continued liveness. The method can also include permitting termination of liveness of dependent child listener objects when their parent objects have continued liveness.

The method can include wherein the child objects are only weakly reachable from their parent objects and the parent objects are strongly reachable from their child objects.

DETAILED DESCRIPTION

Reference is made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
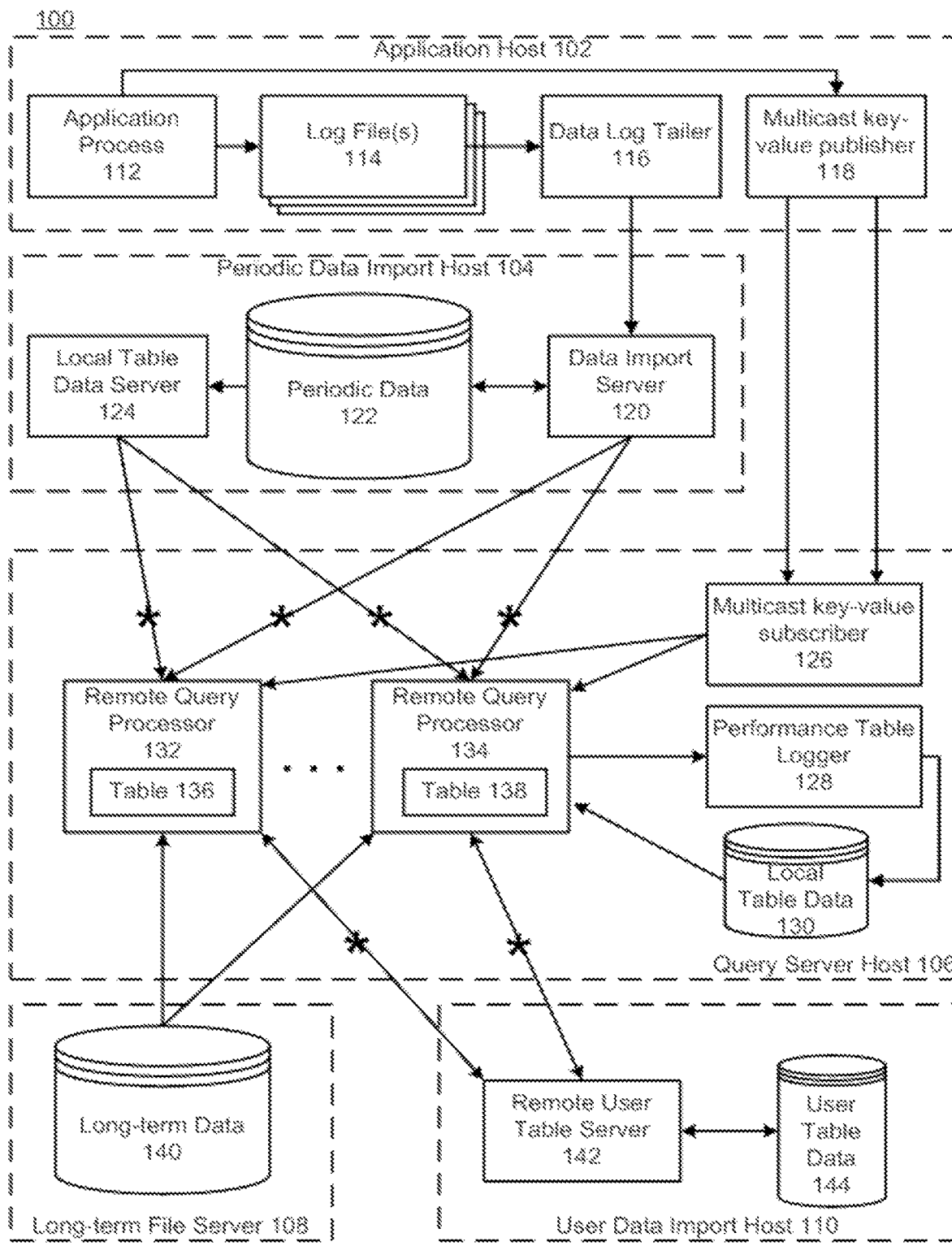
FIG. 1 is a diagram of an example computer data system showing an example data distribution configuration in accordance with some implementations.
Figure 2:
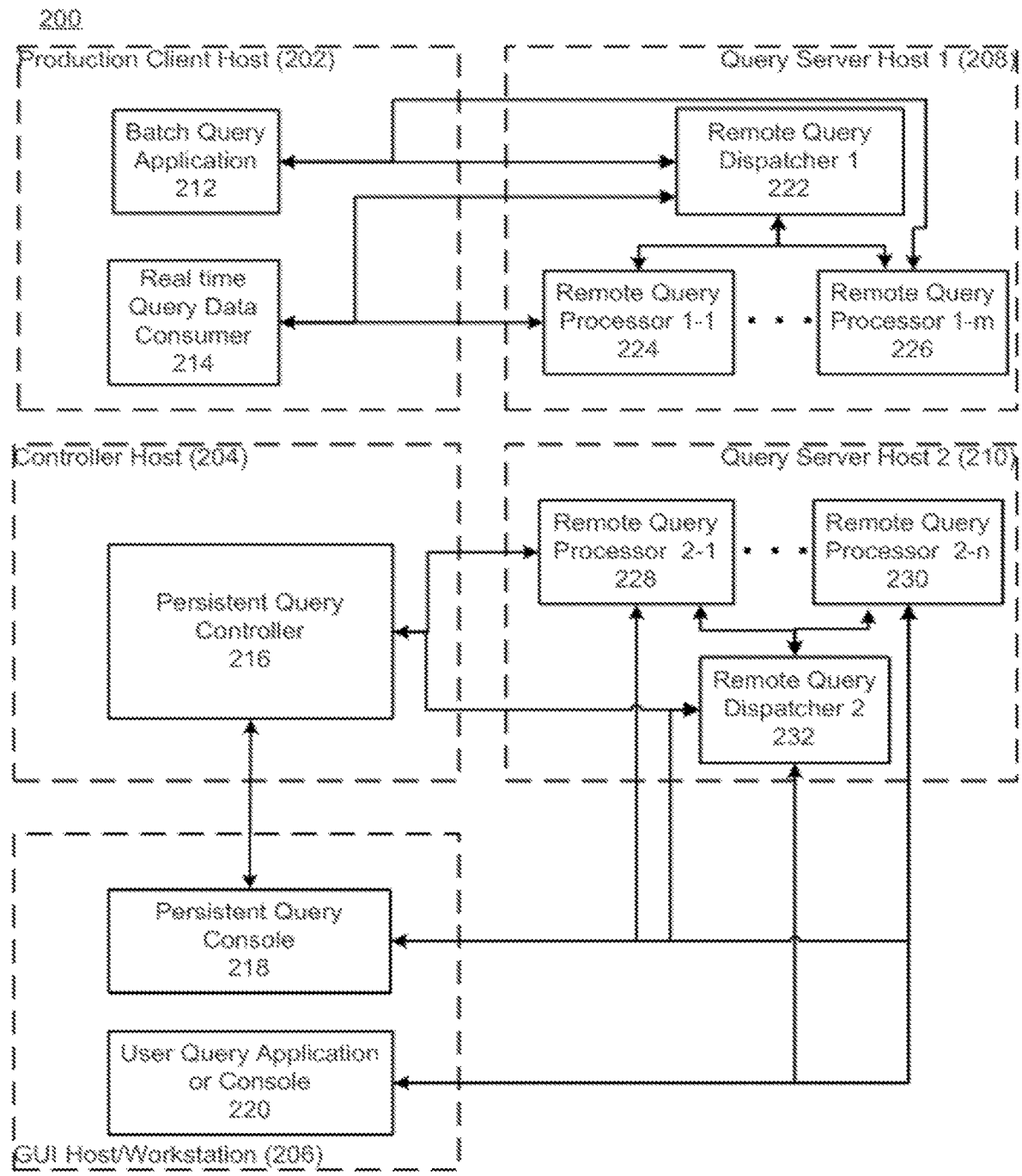
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market open, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
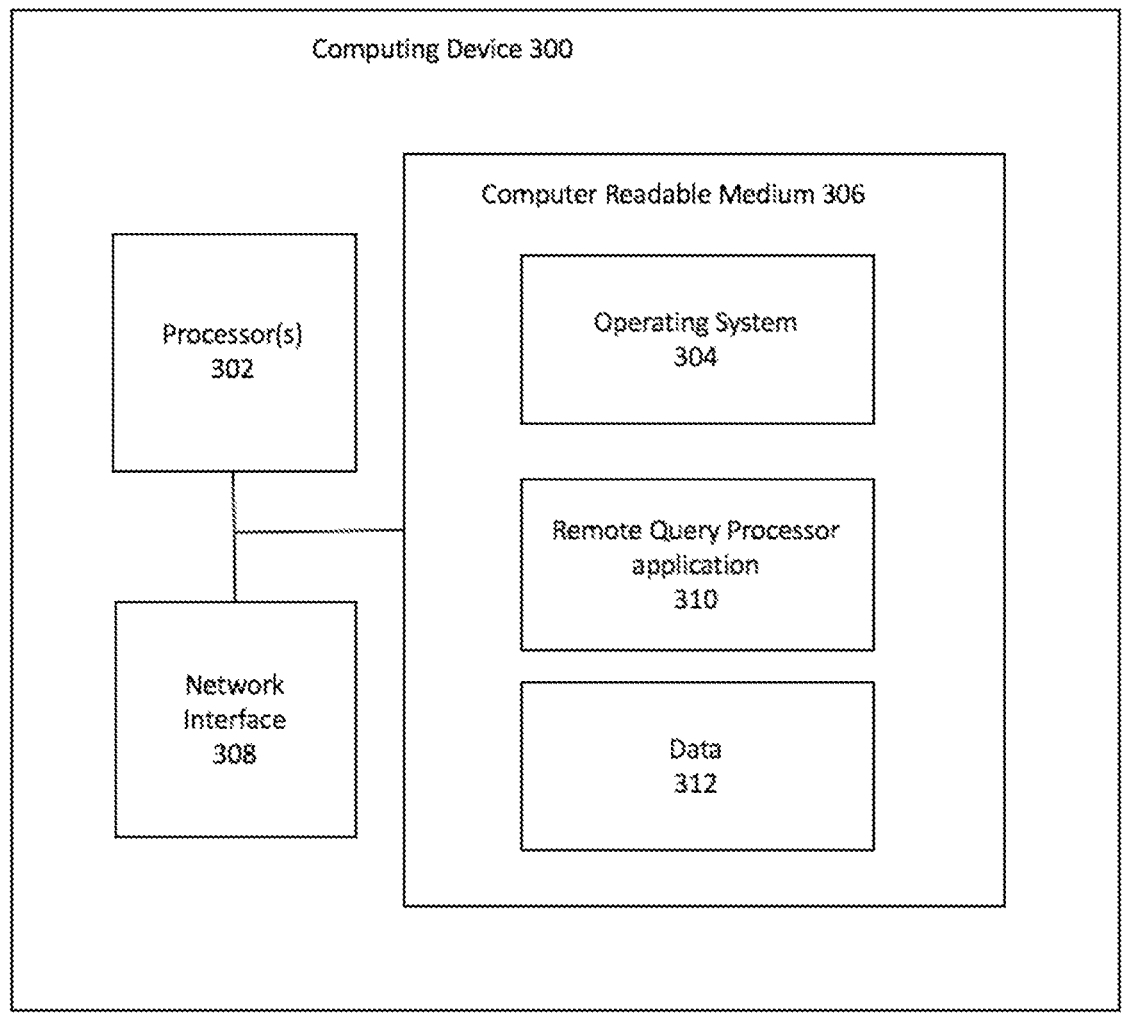
FIG. 3 is a diagram of an example computing device configured for remote query processor processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include remote query processor application 310 and a data section 312 (e.g., for storing ASTs, precompiled code, etc.).

In operation, the processor 302 may execute the application 310 stored in the memory 306. The remote query processor application 310 can include software instructions that, when executed by the processor, cause the processor to perform operations for distributed and optimized garbage collection of remote and exported table handle links to update propagation graph nodes in accordance with the present disclosure (e.g., performing one or more of 602-632; 702-708; 802-820 described below).

The remote query processor application program 310 can operate in conjunction with the data section 312 and the operating system 304.

Figure 3A:
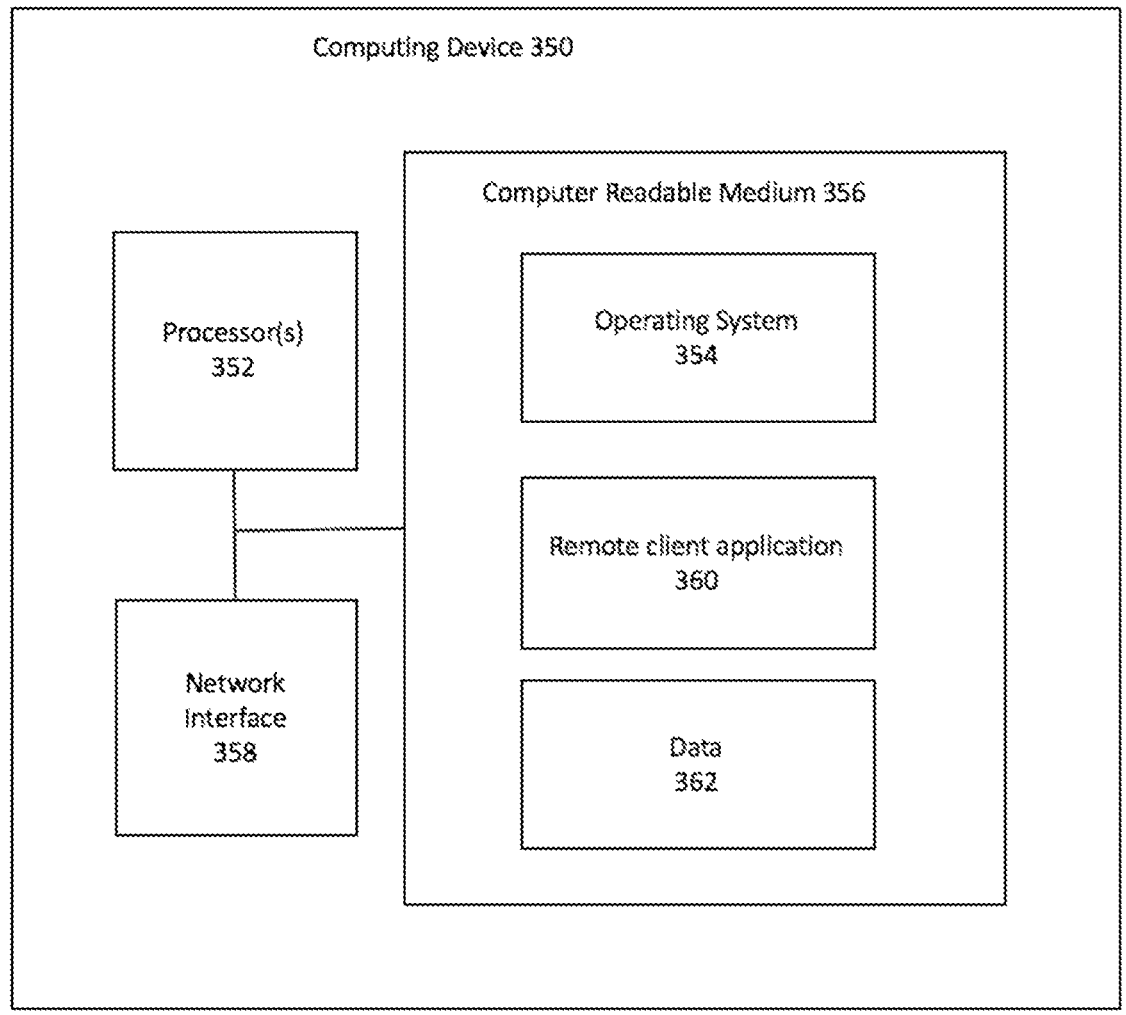
FIG. 3A is a diagram of an example computing device configured for remote client processing in accordance with some implementations.

FIG. 3A is a diagram of an example computing device 350 in accordance with at least one implementation. The computing device 350 includes one or more processors 352, operating system 354, computer readable medium 356 and network interface 358. The memory 356 can include remote client application 360 and a data section 362 (e.g., for storing ASTs, precompiled code, etc.).

In operation, the processor 352 may execute the application 360 stored in the memory 356. The remote client application 360 can include software instructions that, when executed by the processor, cause the processor to perform operations for distributed and optimized garbage collection of remote and exported table handle links to update propagation graph nodes in accordance with the present disclosure (e.g., performing one or more of 602-632; 702-708; 802-820 described below).

The remote client application program 360 can operate in conjunction with the data section 362 and the operating system 354.

Remote clients can have multiple connections to a query server host including communications to conduct query operations on the query server host that can result in creating an update propagation graph to map out static and dynamic nodes that represent the query execution. In order to allow a remote client to interact with nodes in the update propagation graph on the server, e.g. for display, remote method invocation, or querying, an exported table handle can be created on the server side and a remote table handle on the client side to handle the links between the remote client and the update propagation graph tables on the server.

Figure 4:
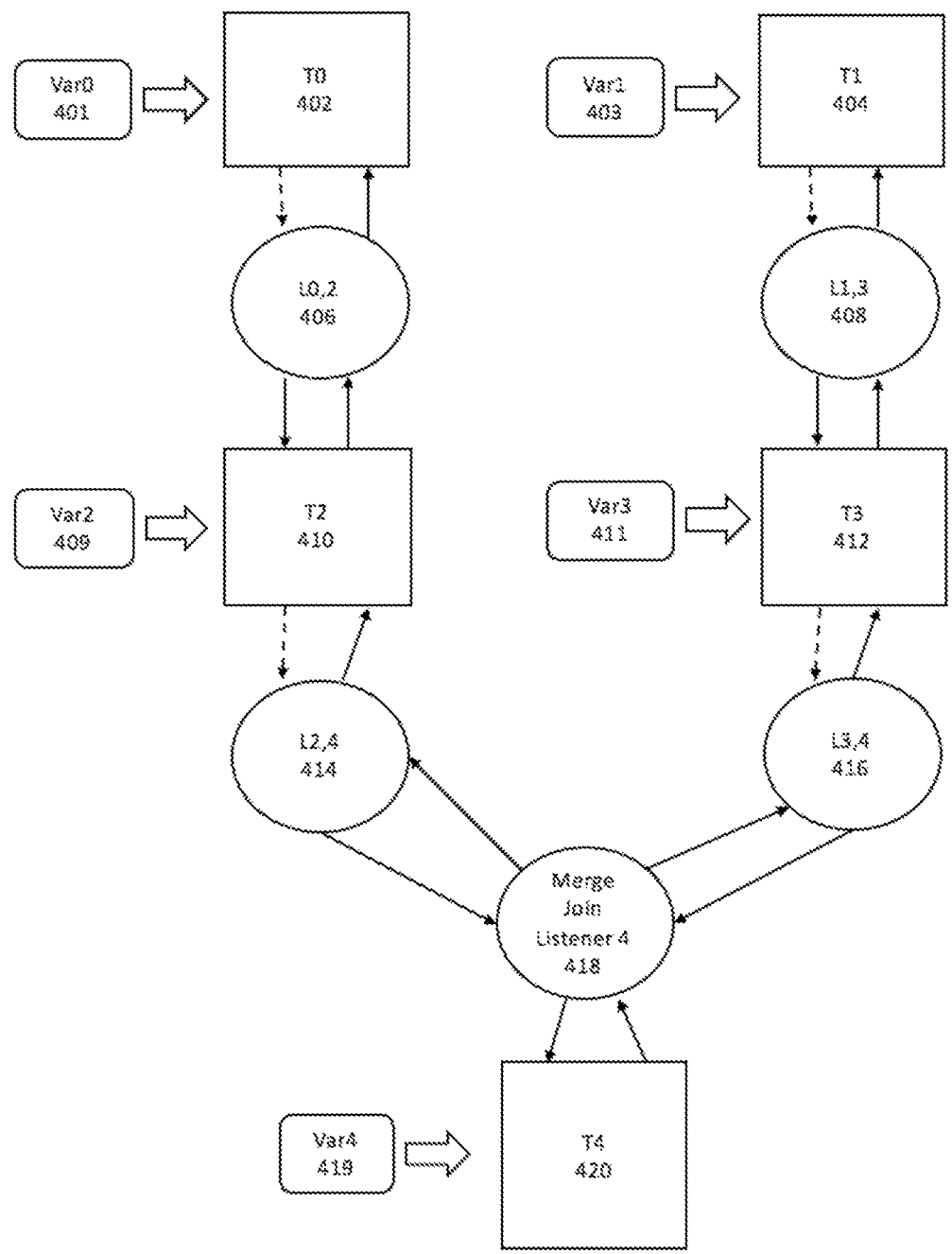
FIG. 4 is a diagram of an example update propagation graph in accordance with some implementations.

FIG. 4 is a diagram of an example update propagation graph with collected references in accordance with some implementations. Variables (401, 403, 409, 411, 419) can be table or object reference variables. For example, variable t7 can refer to the result of a join operation on the referents of variable t8 and variable t9 (not shown). Variable Var0 401 can reference table object T0 402, variable Var1 403 can reference table object t1 404, variable Var2 409 can reference table object T2 410, Var3 411 can reference table object T3 412, and Var4 419 can reference table object T4 420.

Table object T2 410 can be a child node of table object T0 402 and table object T3 412 can be a child node of table object T1 404. Table object T4 420 can be a child node of a join operation on table object T2 410 and table object T3 412. L0,2 406 can be a notification listener for propagating update notifications from table object T0 to table object T2 410. L1,3 408 can be a notification listener for propagating update notifications from table object T1 404 to table object T3 412. L2,4 414 can be a notification listener for propagating update notifications from T2 410 to a merge join listener 4 418. L3,4 can be a notification listener for propagating update notifications from table object T3 also to merge join listener 4 418. Merge join listener 4 418 can be a notification listener for propagating join update notifications to table object T4 420. FIG. 4 contains two types of arrows, an arrow with a broken line and an arrow with a solid line. In this example, the arrows with broken lines represent weak references in the direction of the arrow for propagating update notifications from a parent, such as T0 402 to a child listener, such as L0,2 406. Arrows with solid lines represent strong references in the direction of the arrow.

It will be appreciated that a weak reference does not prevent garbage collection of its referent, in this case a query update graph listener for propagating changes from a parent to a child node. A strong reference from a child node to a parent node serves to prevent garbage collection of the parent node until the child is no longer strongly reachable. Were the parent to hold strong references to the child listeners, this would prevent sub-graphs that are not externally reachable from being garbage collected.

Figure 4A:
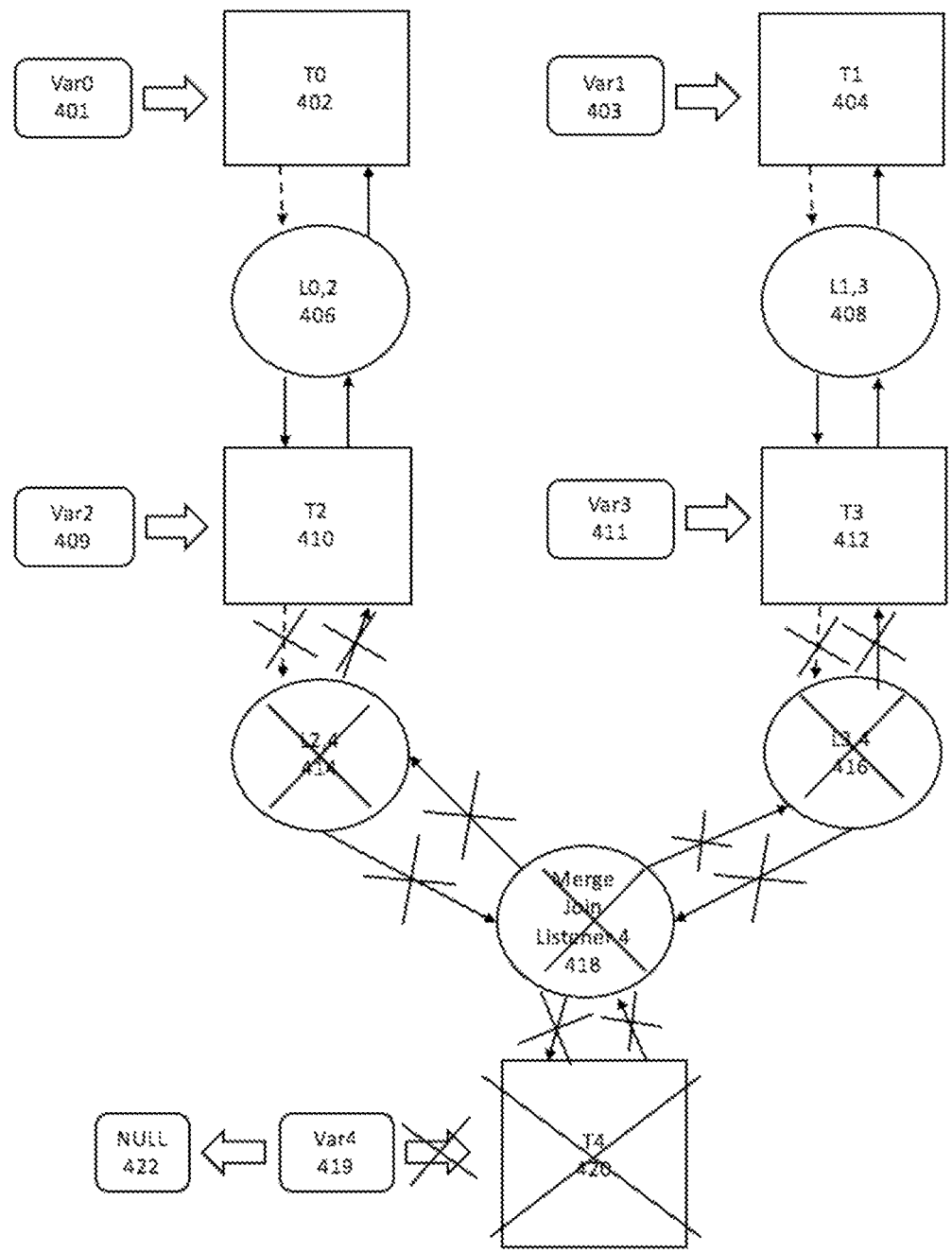
FIG. 4A is a diagram of an example update propagation graph with collected references in accordance with some implementations.

FIG. 4A is a diagram of an example update propagation graph with collected references in accordance with some implementations. In this example, a query operation can re-assign a variable Var4 that previously referred to T4 420 to be NULL 422, thereby rendering T4 420 and its associated listeners Merge Join Listener 4 418, L2,4 414, and L3,4 416 only weakly reachable. Accordingly, the garbage collector can remove (make finalizable, finalize, and reclaim) table object T4 420 and listeners Merge Join Listener 4 418, L2,4 414, and L3,4 416 from memory and thus from the update propagation graph.

Figure 5:
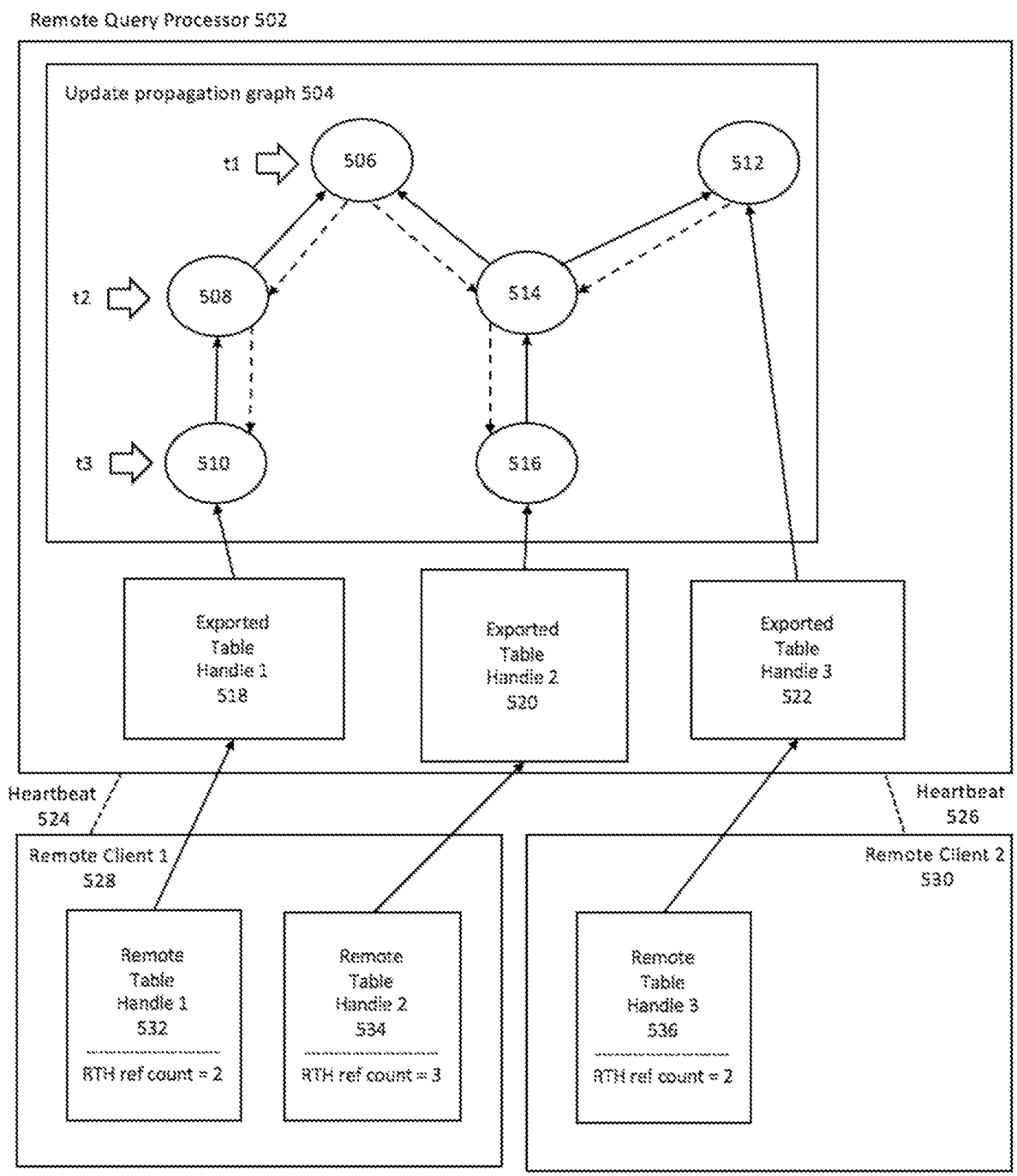
FIG. 5 is a diagram of an example remote query processor and remote clients in accordance with some implementations.

FIG. 5 is a diagram of an example remote query processor 502 and remote clients 524, 530 in accordance with some implementations. A remote query processor 502 can contain one or more update propagation graphs 504 and one or more exported table handles (518, 520, 522). An update propagation graph 504 can contain parent object nodes, such as 506, 512, and children nodes that are downstream to the parent object nodes, such as 508, 514, 510, 516. Some object nodes such 508, 514 can serve as both a parent and a child. For example, t1 table object 506 can be a parent to child t2 table object 508, and t2 table object 508 can be a parent to child t3 table object 510. The arrows with broken lines between the nodes can be weak references in the direction of the arrow and the arrows with solid lines between the nodes can be strong references. A remote client 528, 530 can have one or more remote table handles 532, 534, 536.

A remote table handle 532, 534, 536 can be created on a remote client 528, 530 to maintain an active link to a corresponding exported table handle 518, 520, 522 on a remote query processor 502. An exported table handle 518, 520, 522 can be created in response to a query operation on table objects in an update propagation graph 504. For example, Remote client 1 528 can send a query request in the form of t3=t2.select( ) to a remote query processor 502. In response, the remote query processor 502 can create table object t3 510 in the update propagation graph with the appropriate weak and strong references between t3 510 and t2 508. The remote query processor 502 can then create an exported table handle 1 518 with a strong reference to t3 510 and send a stub with the exported table handle information, including an identifier for the exported table to be used in subsequent messages, e.g. a handle release message, or a remote method invocation message, to the remote client 1 528. The remote client 1 528 remote table handle manager (not shown) can then create a remote table handle 1 532 to communicate with the exported table handle 518 on the remote query processor 502 for any further access to t3 510. Remote table handles 532, 534, 536 can contain a remote table handle (RTH) reference count. A remote table handle 532, 534, 536 can remain alive as long as its RTH reference count remains greater than zero.

It will be appreciated in the example that as long as the strong reference from the exported table handle 1 518 remains in place, t3 510 cannot be garbage collected. But if the strong reference from the exported table handle 1 518 is removed, t3 510 can then be garbage collected because the only reference to t3 510 would be a weak reference from the t3 510 parent, t2 508.

It will also be appreciated that the same exported table can be shared with multiple clients and that reference counting can occur on the exported table handle to track connected clients and to determine when to remove the exported table handles. It will also be appreciated that if the reference counting occurs on the exported table handle, then reference counting on the remote table handle may not be necessary.

A heartbeat signal 524, 526 can exist between each remote client 524, 526 and each remote query processor 502. A heartbeat signal 524, 526 can be used to determine whether a remote client 528, 530 is connected to a remote query processor 502 during period of remote client 528, 530 inactivity. It can be assumed by a remote query processor 502 that if a heartbeat signal 524, 526 is no longer detected from a remote client 528, 530 that the remote client has disconnected from the remote query processor 502.

It will be appreciated that a heartbeat signal and a monitoring of a heartbeat signal is just one example of a liveness indication system. Other methods may exist for determining the status of connections between processes and/or computers.

It will be appreciated that one or more remote query processors 502 can be connected to one or more remote clients. One remote query processor 502 can be connected to one or more clients and one client can be connected to one or more remote query processors 502.

Figure 5A:
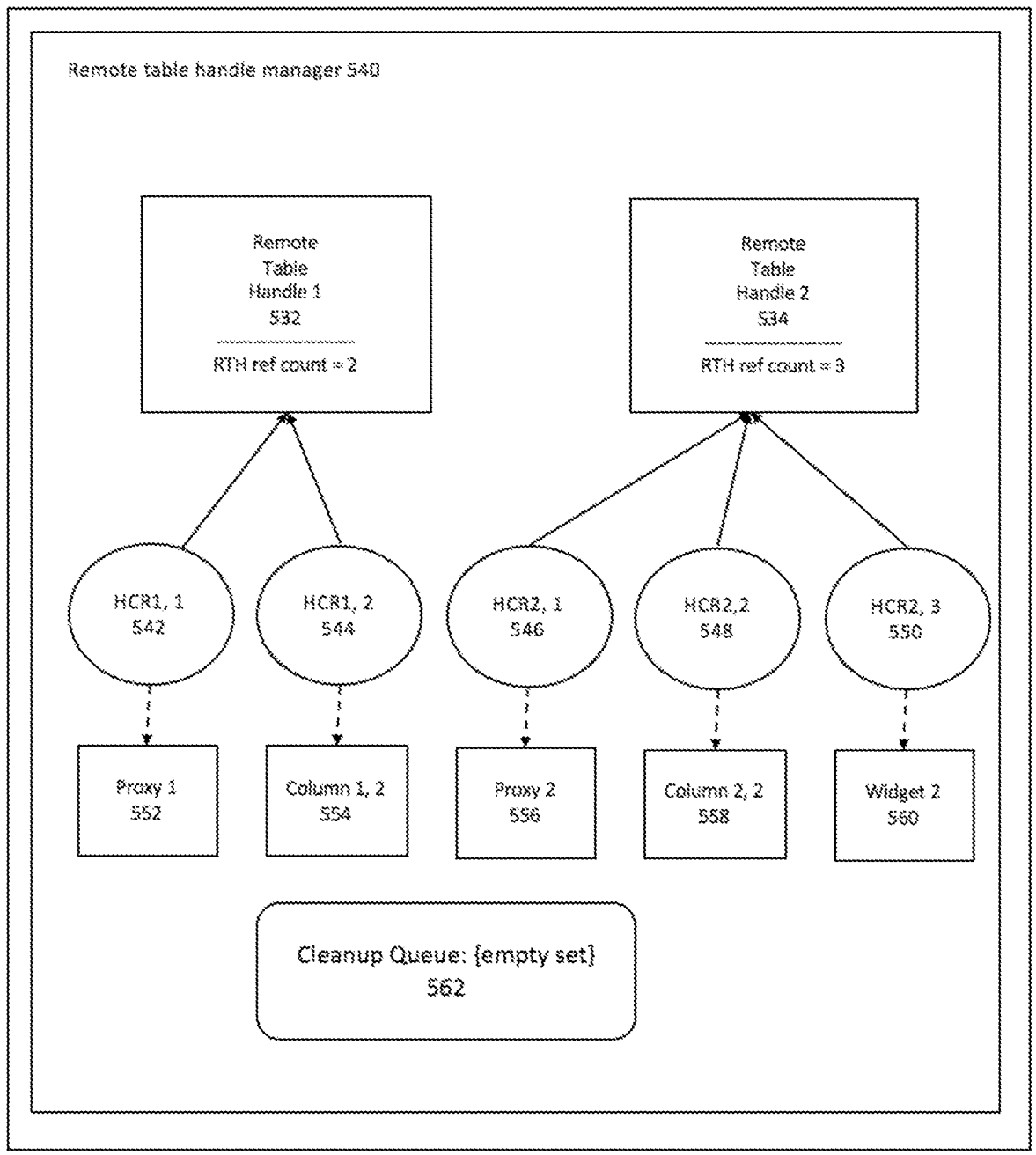
FIG. 5A is a diagram of an example remote table handle manager in accordance with some implementations.

FIG. 5A is an example diagram of a remote client 1 528 that can contain a remote table handle manager 540. A remote table handle manager 540 can create and manage one or more remote table handles 532, 534, one or more handle cleanup references (HCR) (542, 544, 546, 548, 550) per each remote table handle 532, 534, one or more proxy objects (552, 556) per each HCR (542-550), one or more column objects (554, 558) per each HCR (542-550), one or more widgets 560 per HCR (542-550), and a cleanup queue 562.

A remote table handle 532, 534 can contain a remote table handle (RTH) reference count for each link to a handle cleanup reference (542-550). For example, remote table handle manager 540 can create an HCR for each proxy, column, and/or widget that is part of a table referenced by remote table handle 1 532. For example, if remote table handle 1 532 references a table with 1 proxy and 1 column, remote table handle manager 540 can create HCR1, 1 542 to reference the proxy 1 552 and HCR1, 2 to reference the column 1, 2 554. Continuing with the example, remote table handle 1 532 can have an RTH reference count of 2 because remote table handle 1 532 is connected to 2 HCRs, HCR1,1 542 and HCR1,2 544. Each of the connections can be a weak reference as represented by an arrow with a broken line. Similarly, remote table handle 2 534 can have an RTH reference count of 3 because remote table handle 2 534 is connected to 3 HCRs, HCR2, 1 546, HCR2, 2 548 and HCR2, 3 550.

It will be appreciated that a table can have multiple proxies, columns and widgets. An HCR can be created for each proxy, column, and widget.

It will also be appreciated that a cleanup queue 562 can be empty or contain handle cleanup references that have been designated for cleanup. This concept is further described below.

Figure 5B:
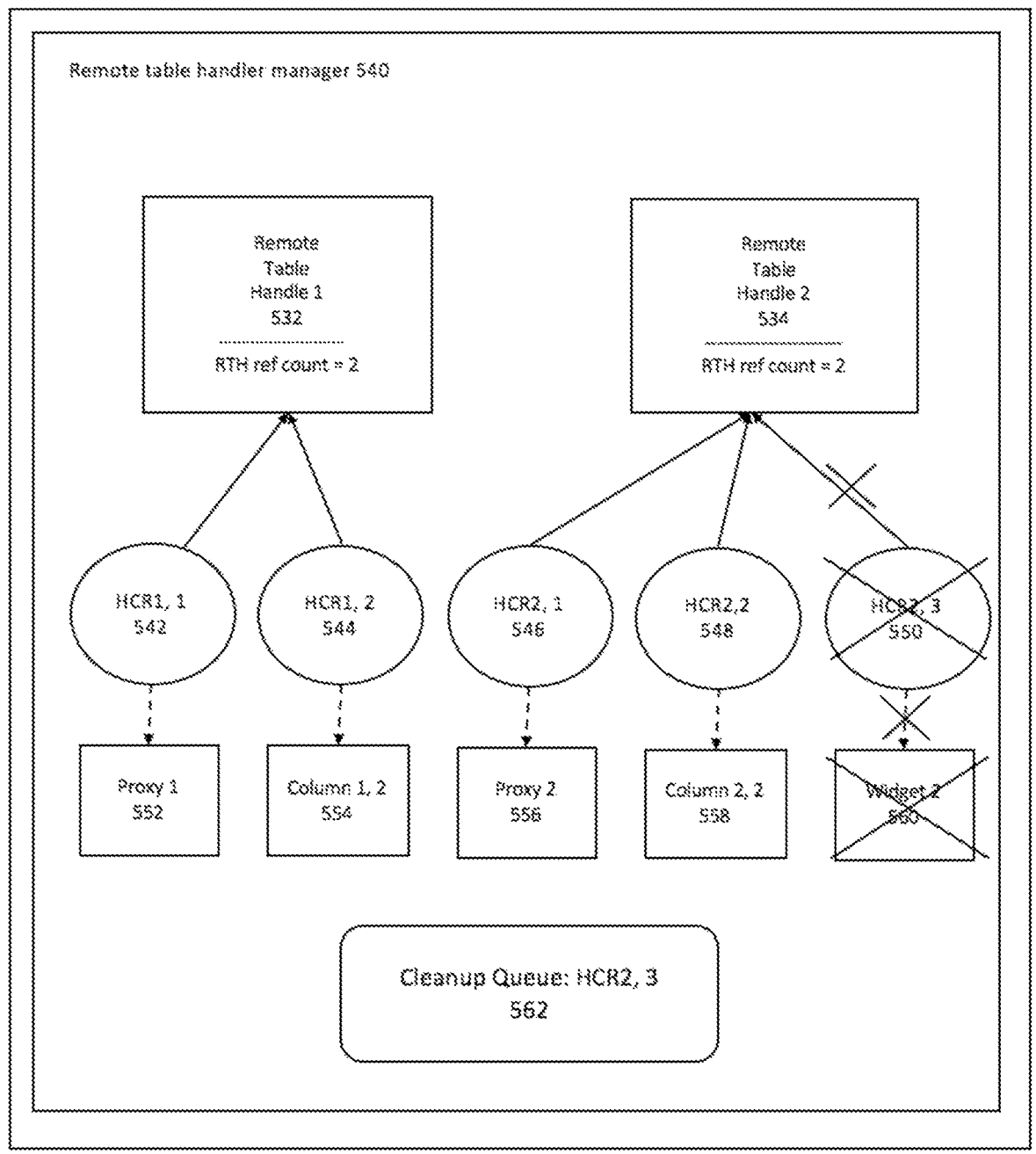
FIG. 5B is a diagram of an example remote table handle manager in accordance with some implementations.

FIG. 5B is an example diagram of a remote client 1 528 that can contain a remote table handle manager 540 with a widget reference removed from a remote table handle 534. In this example, a widget has been removed from the table represented by the remote table handle 2 534. The system garbage collection code (not shown) can then remove the HCR2, 3 550 reference because the reference between the widget 2 560 and the HCR2, 3 550 is a weak reference as shown by the broken arrow, and a weak reference does not prevent garbage collection. The system garbage collection code can place the HCR2, 3 reference into the cleanup queue 562 because the link between the HCR2, 3 550 and widget 2 560 reference is a weak reference. The remote table handle manager 540 can monitor the cleanup queue 562. Next, the remote table handle manager 540 can dequeue HCR2, 3 from the cleanup queue 562 and can invoke an HCR cleanup method (not shown). The HCR cleanup method can then decrement the remote table handle 534 RTH reference count from 3 to 2 and remove HCR2, 3 from the set of HCRs being monitored by the remote table handle manager 540.

It will be appreciated that in this example, the remote table handle 2 532 remains alive because the RTH reference count for the remote table handle 2 532 remains at a value greater than zero.

It will also be appreciated that for the example where the reference counting occurs on the exported table handle instead of the remote table handle, then a separate exported table handle can be requested for each handle cleanup reference and dependent object on the client. It will also be appreciated that for the example of reference counting occurring on the exported table handle and not on the remote table handle, then cleanup references may not be used on the server side, except as an alternative to reference counting if a same object is exported multiple times. In this example, the server may not need to notify a client that an exported object is not reachable because the client may have already released the exported object.

Figure 5C:
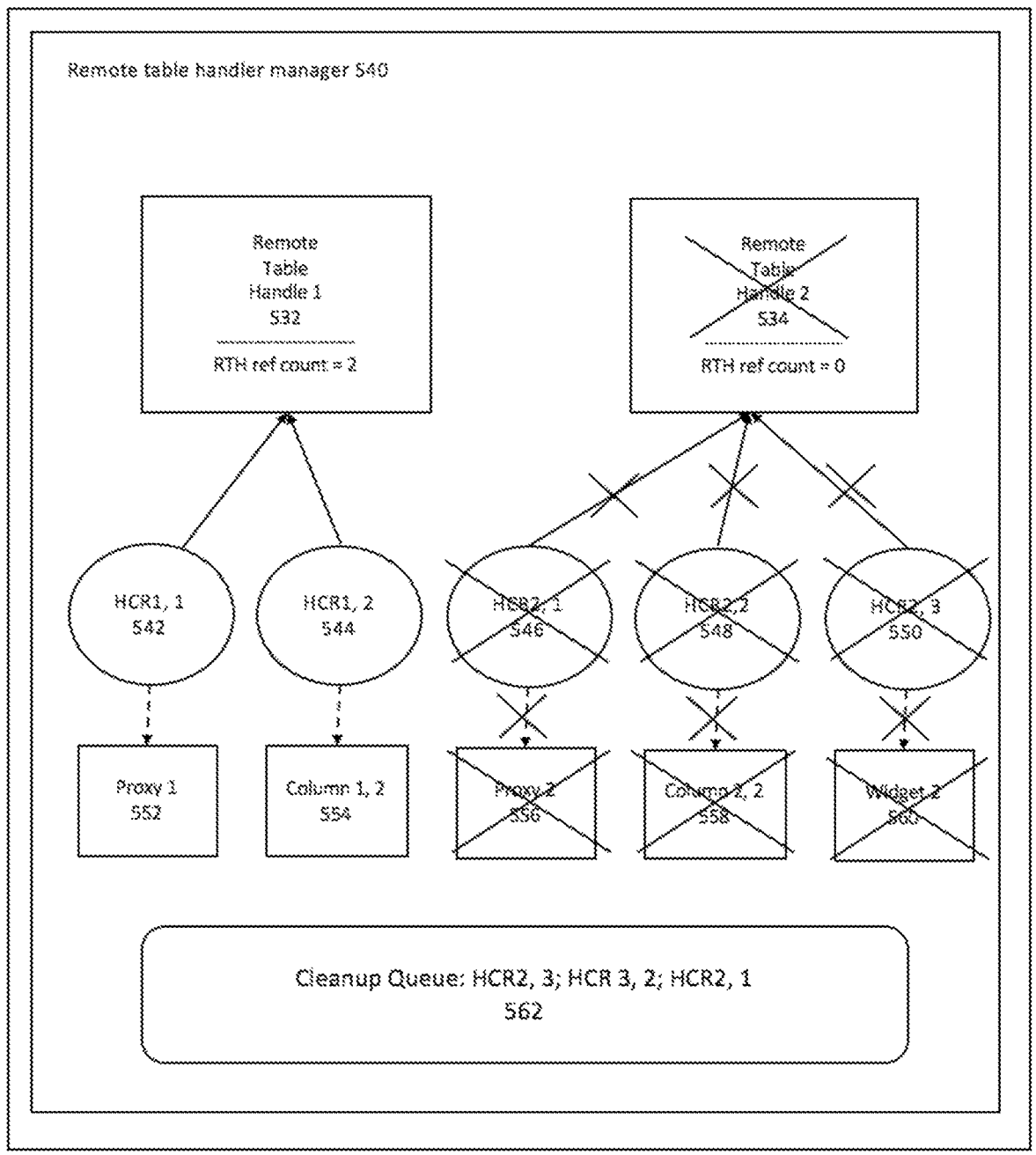
FIG. 5C is a diagram of an example remote table handle manager in accordance with some implementations.

FIG. 5C continues the example of FIG. 5B. A proxy 2 556 and a column 2, 2 558 can be removed from the table represented by the remote table handle 2 534. The system garbage collection code (not shown) can then remove the HCR2, 1 546 reference and the HCR2, 2 reference because the references are weak references as shown by the broken arrow, and a weak reference does not prevent garbage collection. The system garbage collection code can place the HCR2, 1 546 reference and the HCR2, 2 548 reference into the cleanup queue 562 because the link between the HCR2, 1 546 reference and proxy 2 556, and the link between the HCR2, 2 548 reference and column 2, 2 558 are weak references. The remote table handle manager 540 can continue monitoring the cleanup queue 562. Next, the remote table handle manager 540 can dequeue HCR2, 1 and HCR2, 2 from the cleanup queue 562 and can invoke their HCR cleanup methods (not shown). The HCR cleanup methods can then decrement the remote table handle 534 RTH reference count from 2 to 0 and remove HCR2, 1 and HCR2,2 from the set of HCRs being monitored by the remote table handle manager 540. Because the remote table handle 2 534 now has a reference count of zero, the remote table handle manager 540 can remove the remote table handle 2 534 and take further action as shown in FIG. 5D to start a cleanup of matching resources on the server side.

Figure 5D:
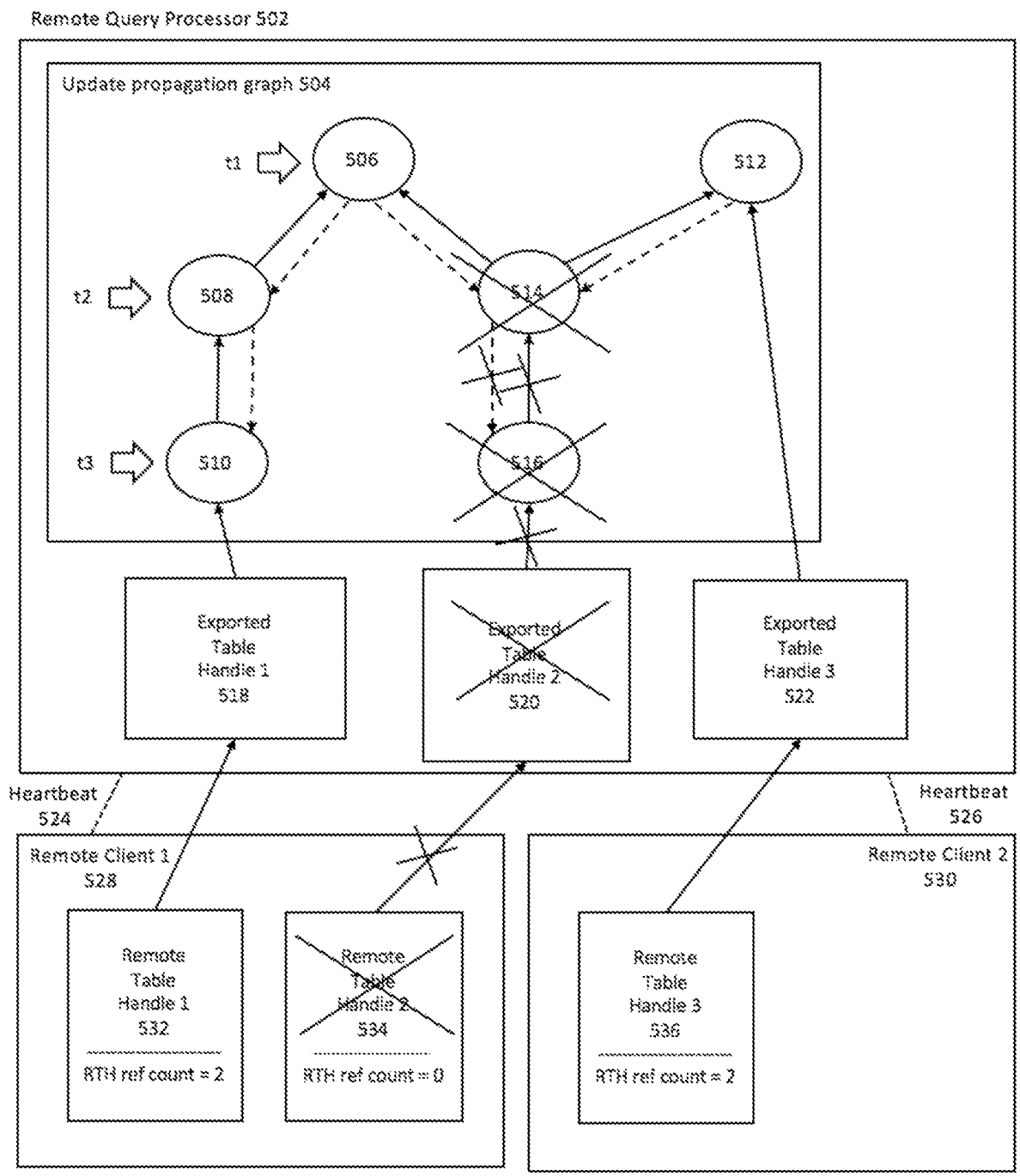
FIG. 5D is a diagram of an example remote query processor and remote clients in accordance with some implementations.

FIG. 5D is a diagram of an example remote query processor and remote clients in accordance with some implementations. Continuing the example from FIG. 5C, the remote table handle manager 540 on remote client 1 528 can remove the remote table handle 2 534 because the RTH reference count for remote table handle 2 534 has been decremented to zero, thereby releasing client-side system sources that were used to maintain the remote table handle 2 534. The remote table handle manager 540 can also send a message to the remote query processor 502 to remove the exported table handle 2 520, thereby releasing server-side system resources that were used to maintain the exported table handle 2 520. The communication link between the remote table handle 2 534 and the exported table handle 2 520 can also be torn down, which can release communication resources for the link, such as sockets on both the client-side and server-side. Nodes 514 and 516 can then also be garbage collected because 514 and 516 loses the strong references to 514 and 516.

It will be appreciated that a connection can also exist per remote client—remote query processor relationship in place of or in addition to a remote table handle—exported table handle relationship.

Figure 5E:
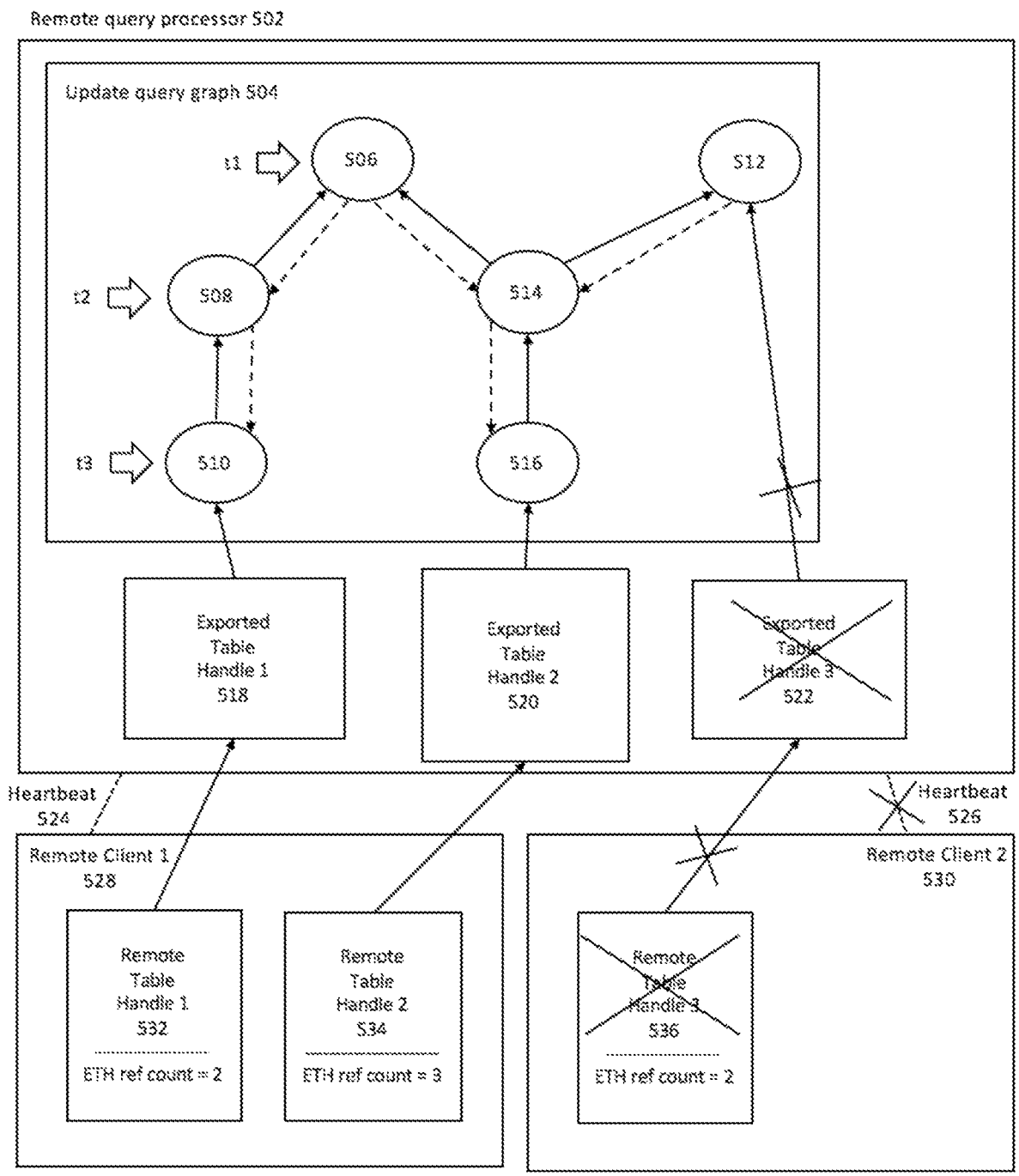
FIG. 5E is a diagram of an example remote query processor and remote clients in accordance with some implementations.

FIG. 5E is a diagram of an example remote query processor and remote clients in accordance with some implementations. In this example, a heartbeat 526 signal between the remote client 2 530 and the remote query processor 502 has been lost. A remote query processor 502 can monitor the heartbeat 524, 526 between a remote query processor 502 and a remote client 528, 530. When a remote query processor 502 does not detect heartbeat 526 signal over a predetermined length of time, the remote client 530 can be determined to be either disconnecting or disconnected from the remote query processor 502. Steps can then be taken on both the client-side and the server side to cleanup resources that were freed up by the disconnection. For example, an exported table handle manager on the server side that is associated with the disconnected client can cleanup all of the exported table handles 522 associated with the disconnecting client 530. The strong references from the exported table handle to the update propagation graph 504 node 512 can also be removed. If the node 512 has no other strong references, the node can be made available for garbage collection. In this example, a strong reference still exists from node 514 to node 512, thus, node 512 can not be made available for garbage collection.

It will be appreciated that a single remote client can have many remote table handles connected to many exported table handles on the server-side, numbering into the hundreds and thousands. The cleanup of these connections after the loss of a heartbeat can release a significant amount of system resources.

Figure 6:
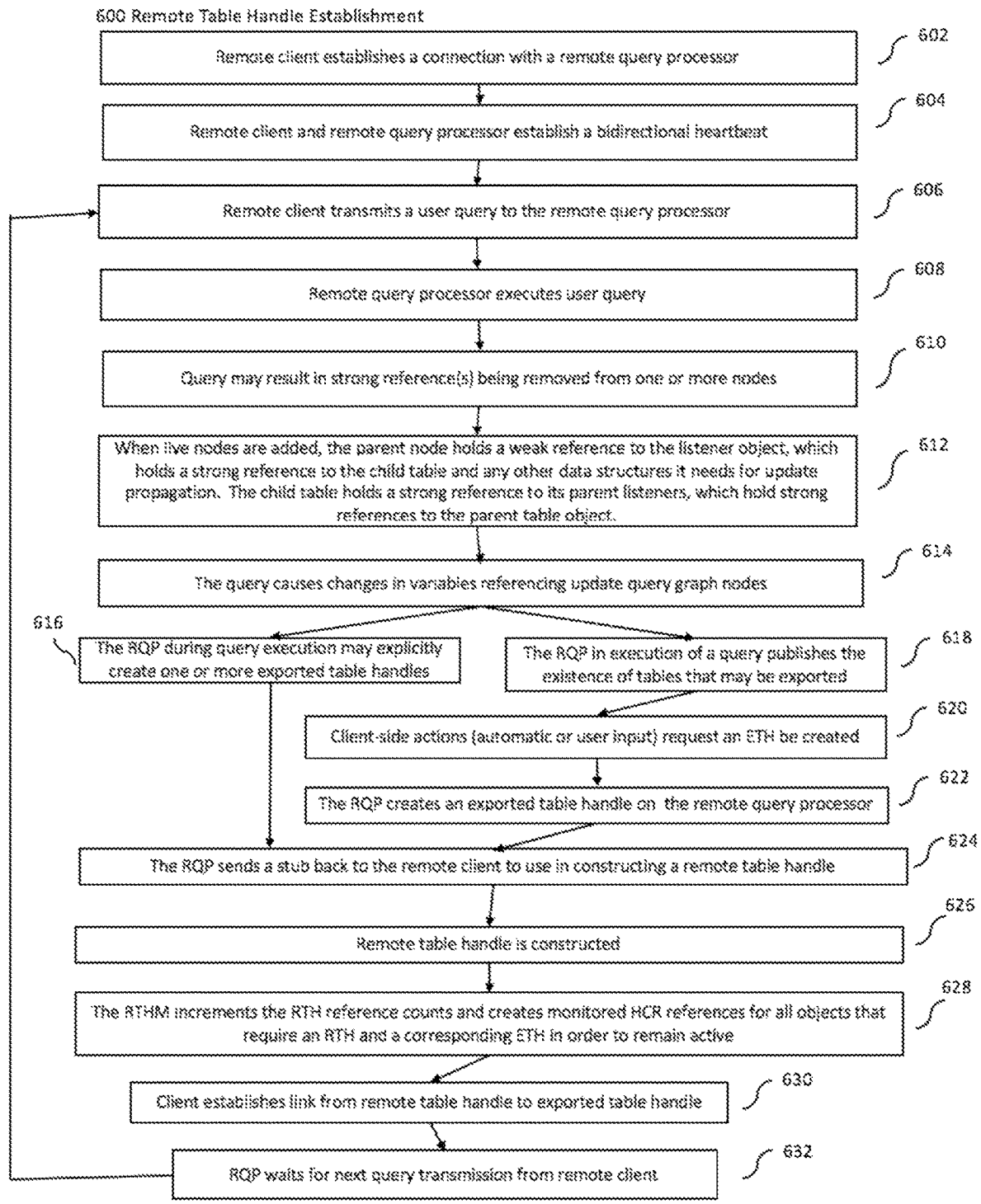
FIG. 6 is a flowchart of an example remote table handle establishment in accordance with some implementations.

FIG. 6 is a flowchart of an example remote table handle establishment in accordance with some implementations. Processing begins at 602, when a remote client establishes a connection with a remote query processor. Processing continues to 604.

At 604, the remote client and remote query processor establish a bidirectional heartbeat connection. Processing continues to 606.

At 606, the remote client transmits a user query to the remote query processor. Processing continues to 608.

At 608, the remote query processor executes the user query. Processing continues to 610.

At 610, the execution of the query may result in one or more strong references being removed from one or more nodes. Processing continues to 612.

At 612, when live nodes are added to an update propagation graph, the parent nodes hold weak references to their respective child listener objects, which in turn hold strong references to their parent table node, their child table node, and any other data structures they need for update propagation. The child table node holds a strong reference to its parent listeners, which hold strong references to the parent table object(s).

It will be appreciated that "live nodes" can be dynamic nodes that can listen for updates and pass on the update information to lower child nodes. Processing continues to 614.

At 614, the query causes changes in variables referencing update propagation graph nodes.

It will be appreciated that variables can be a holder for a strong reference to a table, such as "t1." The contents of a variable, such as t1, can change depending on how t1 is used in a query instruction. For example, t1 can initially be assigned as t1=t2.select( ) but can later be re-assigned as t1=t4.select. Processing continues to 616 and 618.

At 616, the remote query processor, during query execution, may explicitly create one or more export table handles. Processing continues to 624.

At 618, the remote query processor during execution of a query can publish the existence of tables that may be exported. Processing continues to 620.

At 620, client-side actions, either automatic or by user input, can request an exported table handle be created. Processing continues to 622.

At 622, the remote query processor creates an exported table handle on the remote query processor. Processing continues to 624.

At 624, the remote query processor sends a stub back to the remote client to use in constructing a remote table handle. Processing continues to 626.

At 626, a remote table handle is created on the remote client by a remote table handle manager. Processing continues to 628.

At 628, the remote table handle manager increments the remote table handle reference count and creates monitored handle cleanup references (HCR) for all objects that require the remote table handle and its corresponding exported table handle in order to remain active. Processing continues to 630.

At 630, the remote client establishes a link from the remote table handle to the exported table handle.

It will be appreciated that the link can be a logical link or a physical link. Processing continues to 632.

At 632, the remote query processor waits for the next query transmission from a remote client. Process returns to 606.

Figure 7:
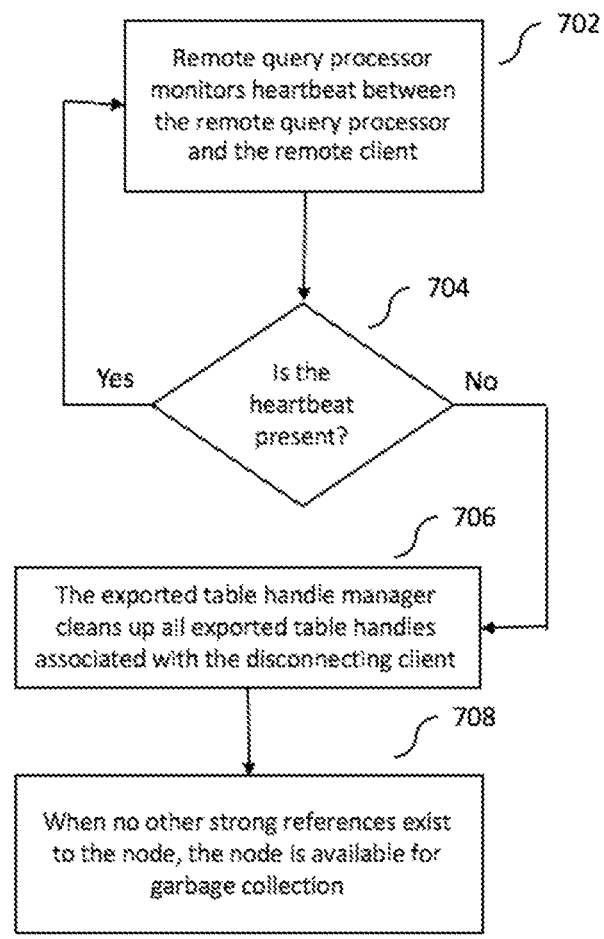
FIG. 7 is a flowchart of an example of loss of heartbeat reference collection in accordance with some implementations.

FIG. 7 is a flowchart of an example of loss of heartbeat reference collection 700 in accordance with some implementations. Processing begins at 702 when a remote query processor monitors for a heartbeat signal between the remote query processor and a remote client. Processing continues to 704.

At 704, a determination by the remote query processor is made as to whether a heartbeat signal the remote client is present. If the heartbeat is present, processing returns to 702 to continue monitoring for the heartbeat signal. If a heartbeat is not present, processing continues to 706.

At 706, an exported table handle manager on the remote query processor cleans up all of the exported table handles associated with the disconnecting or disconnected remote client. Processing continues to 708.

At 708, when no other strong links exist to the node that was connected to an exported table handle manager, the node is available for system initiated garbage collection.

Figure 8:
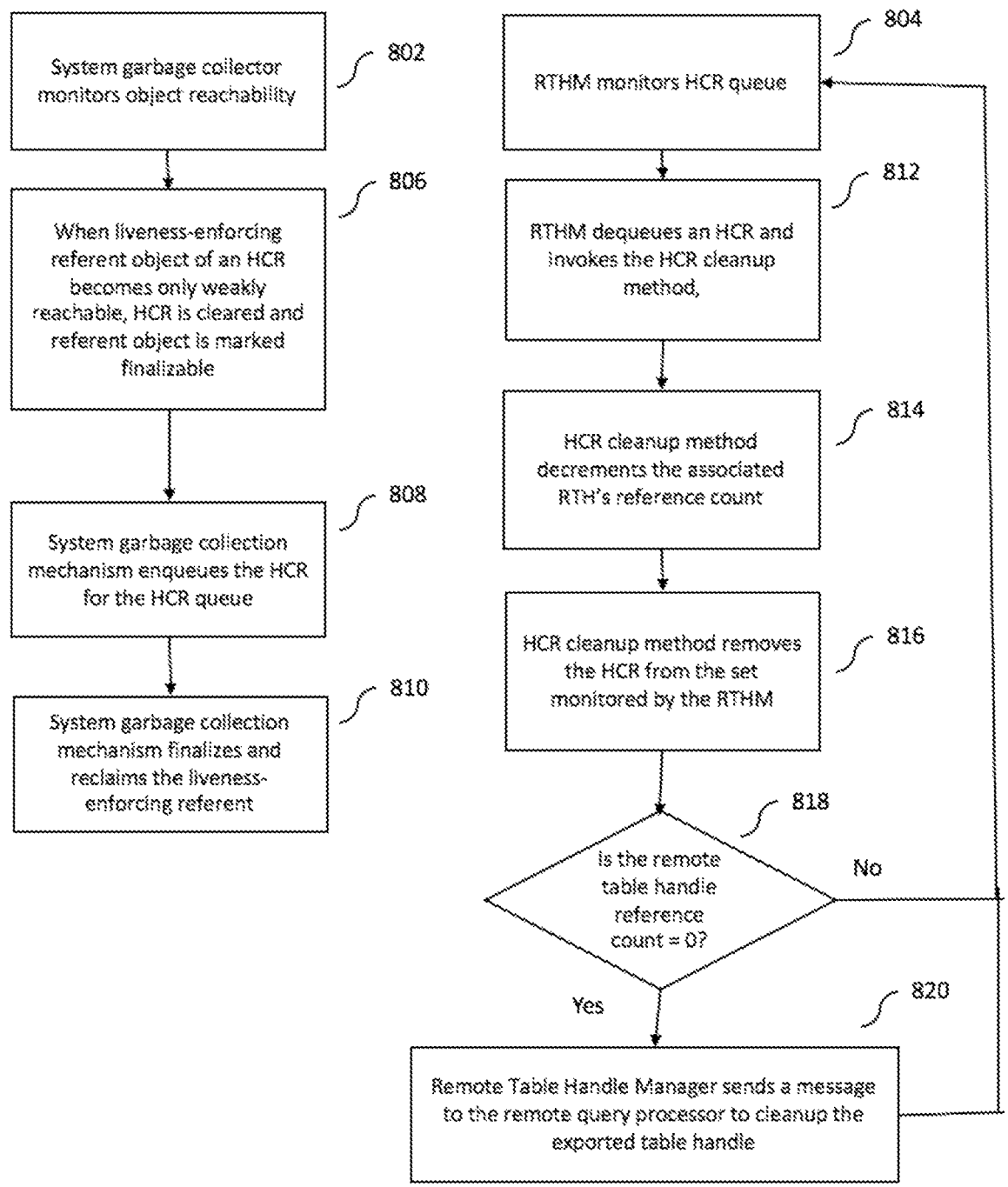
FIG. 8 is a flowchart of an example of non-loss of heartbeat reference collection in accordance with some implementations.

FIG. 8 is a flowchart of an example of non-loss of heartbeat reference collection in accordance with some implementations. Processing begins at 802 and 804.

It will be appreciated that the two flows shown in FIG. 8 are shown without a direct connection between the two flows. The two flows in the example do not have a direct connection but do make use of a common queue, a handle cleanup reference (HCR) queue. One flow places objects into the HCR queue and the other flow retrieves the placed objects from the HCR queue. Steps of the first flow (802-810) are discussed first followed by step of the second flow (804-820).

At 802, a system garbage collector monitors object reachability, including the HCR's referent, which can be any object that requires the remote table handle and exported table handle to remain active. Processing continues to 806.

At 806, when the liveness-enforcing referent object of a handle cleanup reference becomes only weakly reachable, the HCR (as a weak reference) is cleared and the referent object is marked finalizable (eligible to be garbage collected by the system). Processing continues to 808.

At 808, the system garbage collection mechanism enqueues the HCR for the HCR queue. Processing continues to 810.

At 810, the system garbage collection mechanism finalizes and reclaims the liveness-enforcing referent that was previously weakly-reachable from the HCR.

At 804, a remote table handle manager monitors the HCR queue. Processing continues to 812.

At 812, the remote table handle manager dequeues an HCR and invokes an HCR cleanup method.

It will be appreciated that the term "method" here refers to a programming language construct or function, and can be any construct that is available in the programming language used to write the HCR cleanup function. Processing continues to 814.

At 814, the HCR cleanup method determines the remote table handle associated with the dequeued HCR and decrements that remote table handle reference count by one. Processing continues to 816.

At 816, the HCR cleanup method removes the HCR from the set of HCRs monitored by the remote table handle manager. Processing continues to 818.

At 818, the remote table handle manager determines whether the remote table handle reference count is zero. If the remote table handle count is greater than zero, processing returns to 804. If the remote table handle count is zero, processing continues to 820.

At 820, the remote table handle manager sends a digital message to the remote query processor to cleanup the associated exported table handle on the remote query processor. Processing returns to 804.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), graphics processing unit (GPU), or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for distributed and optimized garbage collection of remote and exported table handle links to update propagation graph nodes.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system for managing distributed client-server object handles, the system comprising:
    a remote client computer containing a first one or more hardware processors;
    a server computer containing a second one or more hardware processors;
    the remote client computer containing a first computer readable data storage device coupled to the first one or more hardware processors, the first computer readable data storage device having stored thereon software instructions that, when executed by the first one or more hardware processors, cause the first one or more hardware processors to perform first operations including:
        creating a remote object handle manager;
        establishing a connection with a remote query processor on the server computer;
        establishing a liveness indication system with the remote query processor;
        receiving, from the remote query processor, exported object handle information to construct a remote object handle, including an exported object identifier, the exported object identifier identifying an exported object;
        the remote object handle manager constructing the remote object handle;
        the remote object handle manager monitoring liveness of all client objects that depend on the remote object handle, the remote object handle depending on the exported object and indirectly depending on the exported object's dependencies;
        the remote object handle manager sending a release notification to the remote query processor including the exported object identifier, after no client objects depend on the exported object;
    the server computer containing a second computer readable data storage device coupled to the second one or more hardware processors, the second computer readable data storage device having stored thereon software instructions that, when executed by the second one or more hardware processors, cause the second one or more hardware processors to perform second operations including:
        creating a remote query processor, the remote query processor performing remote query processor operations including:
            creating an exported object handle manager;
            sending the exported object handle information including the exported object identifier from the exported object handle manager to the remote client computer; and preserving a liveness of the exported object at least until any of the following events:
receipt of the release notification from the remote object handle manager; and
the liveness indication system determines the remote client computer is not connected,
the first operations further including:
the remote object handle manager monitoring a handle cleanup reference queue;
after a handle cleanup reference appears in the handle cleanup reference queue, invoking a handle cleanup reference cleanup method;
the handle cleanup reference cleanup method decrementing a remote object handle reference count on a second remote object handle associated with the handle cleanup reference;
the handle cleanup reference cleanup method removing the handle cleanup reference from a set of handle cleanup references monitored by the remote object handle manager;
when the remote object handle reference count after decrementing is zero, sending a digital message to the remote query processor to release an associated exported object handle; and
when the remote object handle reference count after decrementing is greater than zero, maintaining a strong reference to the second remote object handle in order to ensure liveness for dependent client objects.

2. A system for managing distributed client-server object handles, the system comprising:
a remote client computer containing a first one or more hardware processors;
a server computer containing a second one or more hardware processors;
the remote client computer containing a first computer readable data storage device coupled to the first one or more hardware processors, the first computer readable data storage device having stored thereon software instructions that, when executed by the first one or more hardware processors, cause the first one or more hardware processors to perform first operations including:
creating a remote object handle manager;
establishing a connection with a remote query processor on the server computer;
establishing a liveness indication system with the remote query processor;
receiving, from the remote query processor, exported object handle information to construct a remote object handle, including an exported object identifier, the exported object identifier identifying an exported object;
the remote object handle manager constructing the remote object handle;
the remote object handle manager monitoring liveness of all client objects that depend on the remote object handle, the remote object handle depending on the exported object and indirectly depending on the exported object's dependencies;
the remote object handle manager sending a release notification to the remote query processor including the exported object identifier, after no client objects depend on the exported object;
the server computer containing a second computer readable data storage device coupled to the second one or more hardware processors, the second computer readable data storage device having stored thereon software instructions that, when executed by the second one or more hardware processors, cause the second one or more hardware processors to perform second operations including:
creating a remote query processor, the remote query processor performing remote query processor operations including:
creating an exported object handle manager;
sending the exported object handle information including the exported object identifier from the exported object handle manager to the remote client computer; and
preserving a liveness of the exported object at least until any of the following events:
receipt of the release notification from the remote object handle manager; and
the liveness indication system determines the remote client computer is not connected,
wherein the preserving a liveness of the exported object comprises:
maintaining a reference count associated with the exported object;
decrementing the reference count associated with the exported object after receipt of the release notification from the remote object handle manager;
decrementing the reference count associated with the exported object after the liveness indication system determines the remote client computer is not connected;
when the reference count associated with the exported object after decrementing is zero, removing a strong reference to the exported object from the exported object handle; and
when the reference count associated with the exported object after decrementing is greater than zero, maintaining the strong reference to the exported object from the exported object handle.

3. A nontransitory computer readable medium having stored thereon software instructions that, when executed by one or more processors, cause the one or more processors to perform operations including:
creating a remote object handle manager;
establishing a connection with a remote query processor on a server computer;
establishing a liveness indication system with the remote query processor;
receiving from the remote query processor, exported object handle information to construct a remote object handle, including an exported object identifier, the exported object identifier identifying an exported object;
the remote object handle manager constructing the remote object handle;
the remote object handle manager monitoring liveness of all client objects that depend on the remote object handle, the remote object handle depending on the exported object and indirectly depending on the exported object's dependencies;
the remote object handle manager sending a release notification to the remote query processor including the exported object identifier, after no client objects depend on the exported object;
creating a remote query processor, the remote query processor performing remote query processor operations including:
creating an exported object handle manager;

sending the exported object handle information including the exported object identifier from the exported object handle manager to a remote client; and
preserving a liveness of the exported object until receipt of the release notification from the remote object handle manager or until the liveness indication system determines the remote client is not connected,
wherein the preserving a liveness of the exported object comprises:
maintaining a reference count associated with the exported object;
decrementing the reference count associated with the exported object after receipt of the release notification from the remote object handle manager;
decrementing the reference count associated with the exported object after the liveness indication system determines the remote client computer is not connected;
when the reference count associated with the exported object after decrementing is zero, removing a strong reference to the exported object from the exported object handle; and
when the reference count associated with the exported object after decrementing is greater than zero, maintaining the strong reference to the exported object from the exported object handle.

4. A system comprising:
one or more hardware processors; and
a computer readable data storage device coupled to the one or more hardware processors, the computer readable data storage device having stored thereon software instructions that, when executed by the one or more hardware processors, cause the one or more hardware processors to perform operations including:
receiving, from a remote query processor, exported object handle information to construct a remote object handle, including an exported object identifier, the exported object identifier identifying an exported object;
constructing the remote object handle;
monitoring liveness of client objects that depend on the remote object handle, the remote object handle depending on the exported object and indirectly depending on the exported object's dependencies, the monitoring including:
maintaining a remote object handle reference count on the remote object handle, and
decrementing the remote object handle reference count after a dependent client object no longer depends on the remote object handle;
when the remote object handle reference count is zero after the decrementing, sending a release notification to the remote query processor to release an associated exported object handle, the release notification including the exported object identifier, after no client objects depend on the exported object;
monitoring a handle cleanup reference queue; and
after a handle cleanup reference appears in the handle cleanup reference queue, invoking a handle cleanup reference cleanup method, the handle cleanup reference being associated with the remote object handle, the handle cleanup reference cleanup method performing cleanup operations including:
performing the decrementing of the remote object handle reference count on the remote object handle associated with the handle cleanup reference, and
removing the handle cleanup reference from a plurality of handle cleanup references being monitored.

5. The system of claim 4, wherein the operations further include:
transmitting a user query task to the remote query processor, the user query task including an instruction to export the exported object.

6. The system of claim 4, wherein the operations further include:
receiving, from the remote query processor, a publication of a list of objects available for export.

7. The system of claim 4, wherein the operations further include:
when the remote object handle reference count is greater than zero after the decrementing, maintaining a strong reference to the remote object handle in order to ensure liveness for dependent client objects.

8. The system of claim 4, wherein the remote query processor is configured to maintain for the exported object a strong reference to one or more components of an update propagation graph.

9. The system of claim 4, wherein a relationship between the remote object handle and its associated exported object extends an update propagation graph across the remote query processor and a plurality of clients.

10. The system of claim 4, wherein the remote object handle invokes one or more methods on the exported object and delivers return values as one of one or more copied objects or one or more associated remote object handles of associated exported objects.

11. The system of claim 4, wherein the remote query processor is executed on one or more second hardware processors.

12. The system of claim 11, wherein the one or more hardware processors and the one or more second hardware processors are different hardware processors.

13. A method comprising:
receiving, from a remote query processor, exported object handle information to construct a remote object handle, including an exported object identifier, the exported object identifier identifying an exported object;
constructing the remote object handle;
monitoring liveness of client objects that depend on the remote object handle, the remote object handle depending on the exported object and indirectly depending on the exported object's dependencies, the monitoring including:
maintaining a remote object handle reference count on the remote object handle, and
decrementing the remote object handle reference count after a dependent client object no longer depends on the remote object handle;
determining that the remote object handle reference count is zero after the decrementing;
in response to the determining, sending a release notification to the remote query processor to release an associated exported object handle, the release notification including the exported object identifier, after no client objects depend on the exported object;
monitoring a handle cleanup reference queue;
determining that a handle cleanup reference appears in the handle cleanup reference queue, the handle cleanup reference being associated with the remote object handle; and
in response to the determining that the handle cleanup reference appears in the handle cleanup reference queue invoking a handle cleanup reference cleanup method, the handle cleanup reference cleanup method performing cleanup operations including:

performing the decrementing of the remote object handle reference count on the remote object handle associated with the handle cleanup reference, and removing the handle cleanup reference from a plurality of handle cleanup references being monitored.

14. The method of claim 13, further comprising:
transmitting a user query task to the remote query processor, the user query task including an instruction to export the exported object.

15. The method of claim 13, further comprising:
receiving, from the remote query processor, a publication of a list of objects available for export.

16. The method of claim 13, wherein the remote query processor is configured to maintain for the exported object a strong reference to one or more components of an update propagation graph.

17. The method of claim 13, wherein a relationship between the remote object handle and its associated exported object extends an update propagation graph across the remote query processor and a plurality of clients.

18. The method of claim 13, wherein the remote object handle invokes one or more methods on the exported object and delivers return values as one of one or more copied objects or one or more associated remote object handles of associated exported objects.

19. The method of claim 13, wherein a client computer receives the exported object handle information from the remote query processor on a server computer.

20. The method of claim 19, wherein the client computer and the server computer are different computers.

21. A nontransitory computer readable medium having stored thereon software instructions that, when executed by one or more processors, cause the one or more processors to perform operations including:

receiving, from a remote query processor, exported object handle information to construct a remote object handle, including an exported object identifier, the exported object identifier identifying an exported object;

constructing the remote object handle;

monitoring liveness of client objects that depend on the remote object handle, the remote object handle depending on the exported object and indirectly depending on the exported object's dependencies, the monitoring including:

maintaining a remote object handle reference count on the remote object handle, and decrementing the remote object handle reference count after a dependent client object no longer depends on the remote object handle;

when the remote object handle reference count is zero after the decrementing, sending a release notification to the remote query processor to release an associated exported object handle, the release notification including the exported object identifier, after no client objects depend on the exported object;

monitoring a handle cleanup reference queue; and after a handle cleanup reference appears in the handle cleanup reference queue, invoking a handle cleanup reference cleanup method, the handle cleanup reference being associated with the remote object handle, the handle cleanup reference cleanup method performing cleanup operations including:

performing the decrementing of the remote object handle reference count on the remote object handle associated with the handle cleanup reference, and removing the handle cleanup reference from a plurality of handle cleanup references being monitored.

22. The nontransitory computer readable medium of claim 21, wherein the operations further include:
transmitting a user query task to the remote query processor, the user query task including an instruction to export the exported object.

23. The nontransitory computer readable medium of claim 21, wherein the operations further include:
receiving, from the remote query processor, a publication of a list of objects available for export.

24. The nontransitory computer readable medium of claim 21, wherein the operations further include:
when the remote object handle reference count is greater than zero after the decrementing, maintaining a strong reference to the remote object handle in order to ensure liveness for dependent client objects.

25. The nontransitory computer readable medium of claim 21, wherein the remote query processor is configured to maintain for the exported object a strong reference to one or more components of an update propagation graph.

26. The nontransitory computer readable medium of claim 21, wherein a relationship between the remote object handle and its associated exported object extends an update propagation graph across the remote query processor and a plurality of clients.

27. The nontransitory computer readable medium of claim 21, wherein the remote object handle invokes one or more methods on the exported object and delivers return values as one of one or more copied objects or one or more associated remote object handles of associated exported objects.

28. The nontransitory computer readable medium of claim 21, wherein the remote query processor is executed on one or more second processors.

29. The nontransitory computer readable medium of claim 28, wherein the one or more processors and the one or more second processors are different processors.

* * * * *